United States Patent
McGlinchy et al.

(10) Patent No.: US 10,414,051 B2
(45) Date of Patent: Sep. 17, 2019

(54) FILE TRANSLATOR SYSTEM

(71) Applicant: GED INTEGRATED SOLUTIONS, INC., Twinsburg, OH (US)

(72) Inventors: Timothy B. McGlinchy, Twinsburg, OH (US); Anthony Benjamin DiFiore, Lyndhurst, OH (US); Shiu-Chung Fan, Solon, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 365 days.

(21) Appl. No.: 14/937,168

(22) Filed: Nov. 10, 2015

(65) Prior Publication Data

US 2016/0176055 A1 Jun. 23, 2016

Related U.S. Application Data

(60) Provisional application No. 62/081,220, filed on Nov. 18, 2014.

(51) Int. Cl.
*B25J 11/00* (2006.01)
*B25J 9/16* (2006.01)
(Continued)

(52) U.S. Cl.
CPC ......... *B25J 11/0065* (2013.01); *B25J 9/1664* (2013.01); *B25J 9/1674* (2013.01);
(Continued)

(58) Field of Classification Search
None
See application file for complete search history.

(56) References Cited

U.S. PATENT DOCUMENTS 4,433,382 A * 2/1984 Cunningham ..... G05B 19/4083
700/186
4,513,380 A * 4/1985 Spooner ............... G05B 19/186
409/69

(Continued)

FOREIGN PATENT DOCUMENTS

EP 0909602 4/1999
EP 1672451 6/2006
(Continued)

OTHER PUBLICATIONS

International Search Report dated Feb. 26, 2016 and Written Opinion of the International Searching Authority dated Feb. 26, 2016 for PCT International Application No. PCT/US2015/060110, filed Nov. 11, 2015. PCT International Application No. PCT/US2015/06011 corresponds to and claims priority from U.S. Appl. No. 14/937,168, filed Oct. 11, 2015. (12 pages).

(Continued)

*Primary Examiner* — Thomas C Lee
*Assistant Examiner* — Gary Collins
(74) *Attorney, Agent, or Firm* — Tarolli, Sundheim, Covell & Tummino LLP; John A. Yirga, Esq.

(57) ABSTRACT

A disclosed robot system enables an operator of an articulating arm used in fabricating window or door frames to recover the position of the tools during the cleaning process with minimal knowledge or training on a robot. The disclosed robot system also gives the operator the ability to edit a tool cleaning path with simple commands from an operator interface (e.g., HMI) to bring flexibility in customizing the use of the articulating arm.

22 Claims, 34 Drawing Sheets

(51) Int. Cl.
  *G05B 19/408* (2006.01)
  *G05B 19/406* (2006.01)

(52) U.S. Cl.
  CPC ........... *B25J 11/006* (2013.01); *G05B 19/406* (2013.01); *G05B 19/4083* (2013.01); *G05B 2219/36043* (2013.01); *G05B 2219/36266* (2013.01); *G05B 2219/40512* (2013.01); *G05B 2219/50103* (2013.01); *G05B 2219/50111* (2013.01); *G05B 2219/50112* (2013.01); *Y10S 901/02* (2013.01); *Y10S 901/41* (2013.01)

(56) References Cited

U.S. PATENT DOCUMENTS

| | | | |
|---|---|---|---|
| 4,909,982 A | 3/1990 | Ezekoye | |
| 4,971,639 A | 11/1990 | Quinn et al. | |
| 5,117,169 A * | 5/1992 | Kakino | G05B 19/401 318/570 |
| 5,197,013 A * | 3/1993 | Dundorf | G05B 19/4069 219/121.69 |
| 5,414,633 A * | 5/1995 | Chang | G05B 19/4067 700/190 |
| 5,655,247 A | 8/1997 | Allen et al. | |
| 5,682,319 A * | 10/1997 | Boland | G05B 19/4068 318/573 |
| 5,793,635 A * | 8/1998 | Niwa | G05B 19/406 318/570 |
| 6,167,325 A * | 12/2000 | Kamiguchi | G05B 19/4103 700/164 |
| 6,256,546 B1 * | 7/2001 | Graham | G05B 19/4099 700/29 |
| 6,317,646 B1 * | 11/2001 | de Caussin | G05B 19/40937 700/173 |
| 6,401,004 B1 * | 6/2002 | Yamazaki | G05B 19/40937 318/568.1 |
| 6,512,961 B1 * | 1/2003 | Fukaya | G05B 19/40937 700/174 |
| 7,921,064 B2 | 4/2011 | McGlinchy et al. | |
| 8,250,023 B2 | 8/2012 | McGlinchy et al. | |
| 2002/0091460 A1 | 7/2002 | Allen | G05B 19/4166 700/173 |
| 2003/0099522 A1 | 5/2003 | Laempe | |
| 2005/0246052 A1 * | 11/2005 | Coleman | G05B 19/40937 700/188 |
| 2006/0236840 A1 | 10/2006 | McGlinchy et al. | |
| 2007/0191982 A1 * | 8/2007 | Sullivan | G05B 19/4093 700/182 |
| 2008/0083193 A1 | 4/2008 | McGlinchy | |
| 2008/0251975 A1 * | 10/2008 | Gallagher | B29C 33/0011 264/571 |
| 2009/0198378 A1 | 8/2009 | Boerner | |
| 2010/0314029 A1 * | 12/2010 | Lindgren | B23Q 17/20 156/98 |
| 2011/0190915 A1 | 8/2011 | Fujishima | |
| 2012/0024034 A1 * | 2/2012 | Ren | B21D 31/00 72/362 |
| 2012/0054972 A1 | 3/2012 | McGlinchy et al. | |
| 2012/0263519 A1 | 10/2012 | Kotula | |
| 2013/0123945 A1 | 5/2013 | Saylor | |
| 2013/0304248 A1 * | 11/2013 | Lange | G05B 19/18 700/175 |
| 2014/0005819 A1 * | 1/2014 | Garaas | G05B 19/4061 700/122 |
| 2014/0172148 A1 * | 6/2014 | Miller | G05B 19/414 700/183 |
| 2015/0039123 A1 * | 2/2015 | Lindgren | B29C 73/10 700/191 |
| 2015/0051726 A1 * | 2/2015 | Euhus | G05B 19/4097 700/103 |
| 2015/0063936 A1 * | 3/2015 | Azzarello | B25J 11/005 409/132 |
| 2015/0127139 A1 * | 5/2015 | Bolin | G05B 19/4065 700/173 |

FOREIGN PATENT DOCUMENTS

| | | |
|---|---|---|
| FR | 2876165 | 9/2013 |
| WO | WO 2006/030084 | 3/2006 |
| WO | WO 2014/056533 | 4/2014 |

OTHER PUBLICATIONS

International Search Report dated Dec. 24, 2014 and Written Opinion of the International Searching Authority dated Dec. 24, 2014 for PCT International Application No. PCT/US2014/053478, filed Aug. 29, 2014. PCT International Application No. PCT/US2014/053478 corresponds to and claims priority from U.S. Appl. No. 61/871,720, filed Aug. 29, 2013. (10 pages).

Partial Supplemental European Search Report dated Jun. 18, 2018 for European Patent App. No. 15861178.0 entitled File Translator System (13 pages).

Extended European Search Report dated Apr. 24, 2017 for European Patent App. No. 14840338.9 entitled Window Cleaning System and Method (9 pages).

English Translation of French Patent Publication No. FR 2,875,165 (11 pages).

Extended European Search Report dated Oct. 17, 2018 for European Patent App. No. 15861178.0 entitled File Translator System (13 pages).

* cited by examiner

FILE TRANSLATOR SYSTEM

CROSS REFERENCES TO RELATED APPLICATIONS

The following application claims priority to U.S. Provisional Patent Application Ser. No. 62/081,220 filed Nov. 18, 2014 entitled FILE TRANSLATOR SYSTEM. The above-identified application is incorporated herein by reference in its entirety for all purposes.

TECHNICAL FIELD

The present disclosure relates to a method of implementing a file translator system, and more particularly, a file translator system for a program associated with an articulating robotic arm for a window cleaning system having flexible tool utilization and product recognition for cleaning or finishing window frames and/or sashes.

BACKGROUND

Plastic components that make a window frame or sash are typically welded together by miter cutting the components to size, heating the mitered ends and then pressing the heated ends together so that the melted ends bond to each other. This process often squeezes some of the material out from between the two pieces, which creates a bead of material, commonly referred to as weld flash. The weld flash requires further processing to obtain better appearance, as well as to remove material, which may interfere with further assembly of the window itself, such as installing an insulating glass unit (IGU) into a sash or a sash of a frame.

Further processing can be accomplished using a corner cleaner, a machine that removes the weld flash by means of multiple types of tools such as saw blades, knives, end mills or router bits to cut or abrade away the weld flash where it is not desired. Variances in the dimensions of the profile material and/or misalignment of the two parts during the welding process hamper the ability of the machine to remove the weld flash consistently to controlled dimensions due to profile dimensions changing in the frame extrusion.

Discussion of such cleaning issues and advancements are found in U.S. Pat. Nos. 7,921,064 and 8,250,023 to McGlinchy et al. These McGlinchy et al. patents are assigned to the assignee of the present invention and are incorporated herein by reference for all purposes.

U.S. Pat. No. 4,909,892 to Quinn et al. concerns an apparatus for simultaneously welding two or more pairs of thermoplastic frame elements. U.S. Pat. No. 4,971,639 to Quinn et al. concerns a method and apparatus for welding vinyl window and door frames. These Quinn et al. patents are assigned to the assignee of the present invention and are incorporated herein by reference for all purposes.

SUMMARY

One example embodiment of the present disclosure includes a window processing system and method for use in fabricating window frames or sashes. The system includes an articulating arm having a plurality of members that are moveable about multiple axes defined by the articulating arm.

A robot system constructed in accordance with one embodiment enables an operator of the articulating arm to recover the position of the tools during the cleaning process with minimal knowledge or training on a robot, as well as gives the operator the ability to edit a tool cleaning path with simple commands from the operator interface (e.g., HMI), to bring flexibility in customizing the use of the articulating arm.

An exemplary system, can, for example, display a tool path edit screen to receive user inputs of the tool path parameters that are fed to a controller that changes the respective parameter of the tool path. The tool path edit screen can include a selection of a window profile, the portion of the frame or sash to be cleaned, the tool to be used, clamping operations, and/or various options related to the parameters of the tool path. For example, the options related to the parameters of the tool path can include a step forward function, a step backward function, current coordinates values, and new coordinates values (based on a user changes bound by maximum variations). The operator can change one or more of the current coordinates values bounded by limits defined by the specific profile of the raw program. For example, the change can be bound by a threshold value that is a maximum safe adjustment (assured not to damage the frame or sash and/or the articulating arm or other machinery).

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the figures generally wherein like numbered features shown therein refer to like elements throughout unless otherwise noted. The present disclosure relates to a method of implementing a file translator system, and more particularly, a file translator system for a program associated with an articulating robotic arm for a window cleaning system having flexible tool utilization and product recognition for cleaning or finishing window frames and/or sashes.

Figure 1:
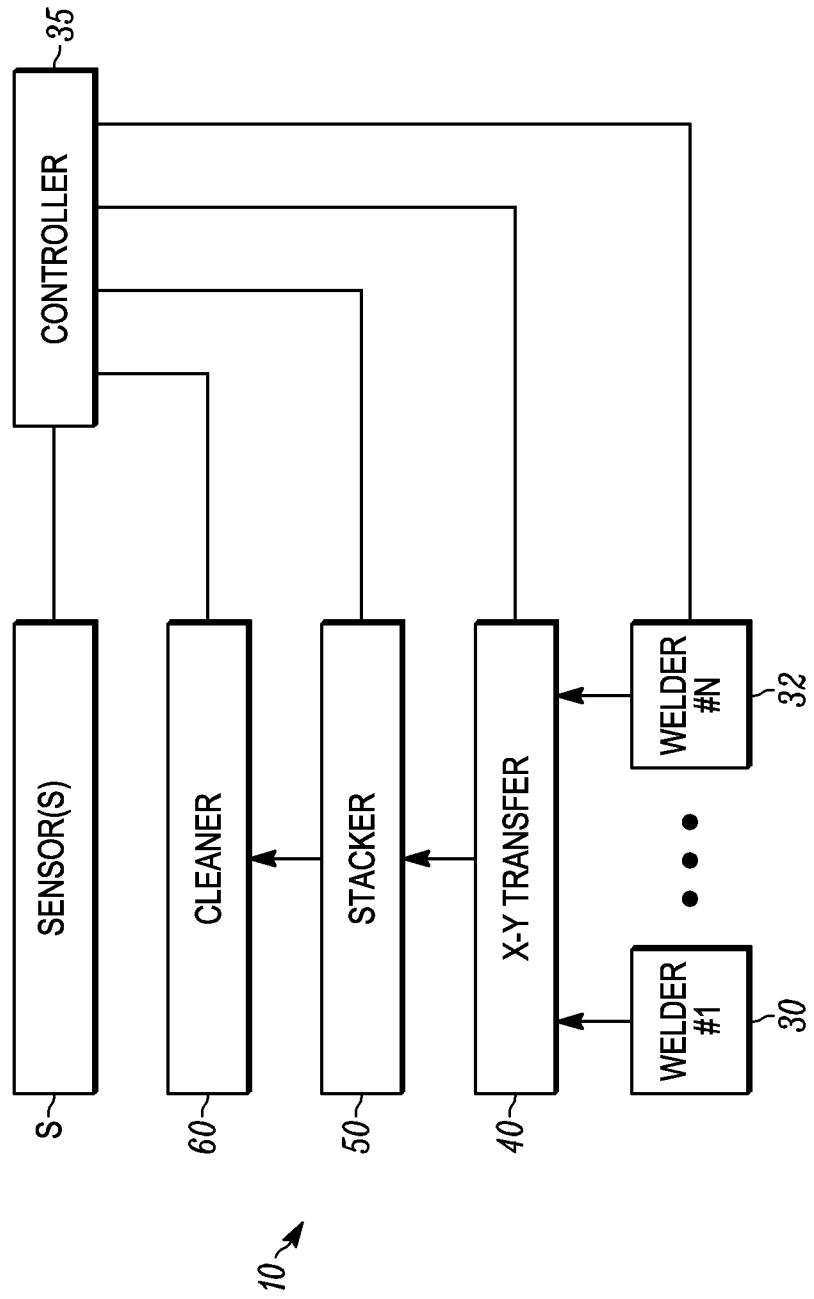
FIG. 1 is an overview schematic block diagram of a window frame or sash processing system.
Figure 3:
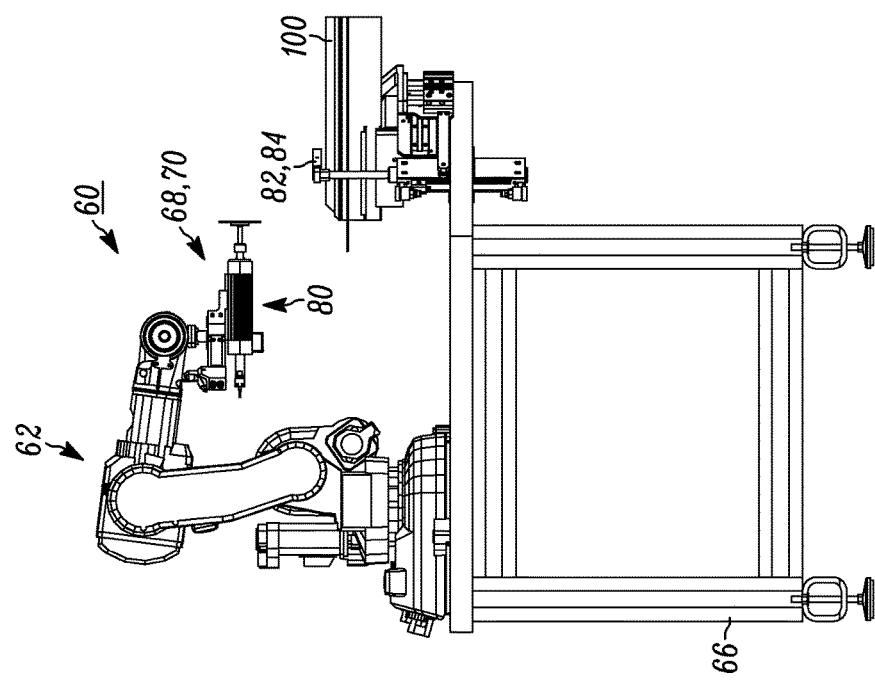
FIG. 3 is a first side elevation view of the cleaning station of FIG. 2.

FIG. 1 schematically depicts a window processing system 10 for fabricating window frames or sashes (hereinafter frame members 100) and includes multiple welding stations 30, 32. In one embodiment, one or more of the welding stations is a sash welding station and one or more additional stations are frame welding stations. Customary usage in the window fabrication business refers to a frame as a stationary part of the window and a sash as the moveable part of the window which is moved to open the window.

Typically, each of the welding stations has multiple welding heads that are actuated independently to move into position relative the different parts of a widow frame. In the disclosed embodiment, each welding station can have multiple frames or sashes stacked on top of each other. The welding stations and other stations, such as a cleaning station 60 are controlled by a controller or controllers 35.

An X-Y transfer table 40 supports welded frames delivered by a weld station exit conveyor and includes a mechanism for moving welded frames to a multi-tiered buffer or stacker 50. The buffer accepts frames from the X-Y table and stores the frames in different stacker layers to await cleaning. In one embodiment, belts automatically move the frame into a cleaner at a cleaning station 60. In an alternate embodiment, the welded frame is moved by hand from a welding machine and placed into a cleaning station.

Cleaning Station 60

Views of a cleaning station 60 constructed in accordance with one example embodiment of the present disclosure are illustrated in FIGS. 2-8. The cleaning station 60 comprises an articulating arm 62, one or more frame securing assemblies 64, a support stand 66, and tool support fixturing assembly 68. The tool support fixturing assembly 68 includes a tool support arrangement 70 for holding a plurality of cleaning tools 80 that are independently enabled and actuated by the controller 35 to translate and rotate into a position relative to selected portions of a window frame member 100. The controller 35 co-ordinates the operation of the welding heads at the weld stations, the conveyor that ejects welded frames 100 from the welding stations, and movement of the frames or sashes to the x-y transfer 40 table through the stacker 50 to the cleaning station 60. The controller 35 can operate according to one or more native programs to control movements of the articulating arm 62. One or more control parameters of the native programs can be edited according to a file transfer system, described below.

Figure 10:
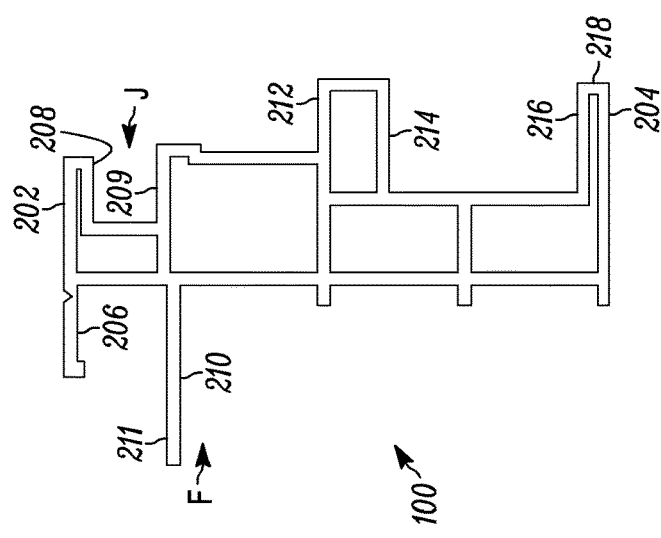
FIG. 10 is a section view illustrating a frame profile signature.
Figure 14:
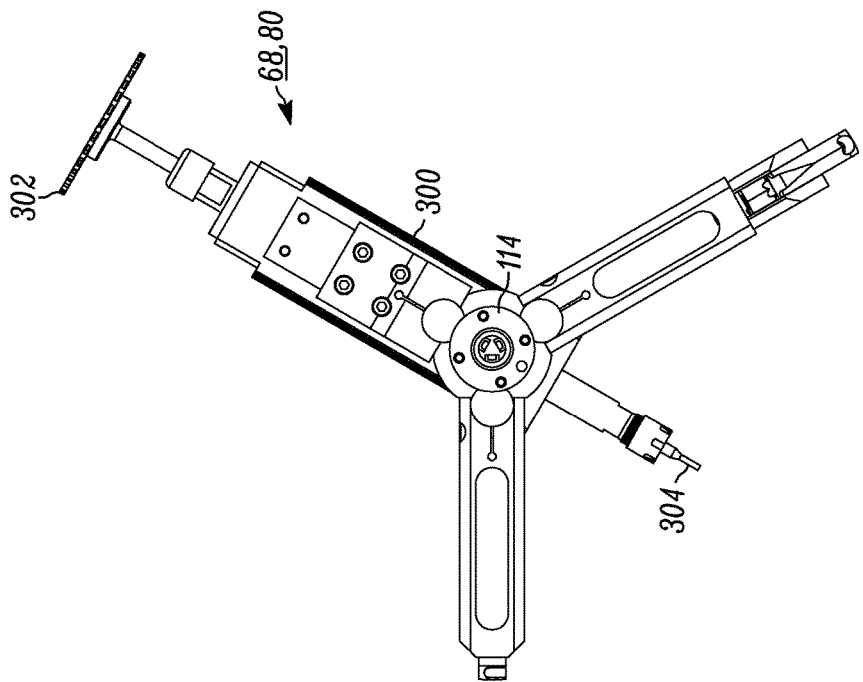
FIG. 14 is a top plan view of the tool support fixture assembly of FIG. 12.

In the exemplary embodiment, a profile of a welded frame or sash 100 placed at the cleaning station 60 is monitored by a sensor S. In one exemplary embodiment, the sensor S is a visual sensor that includes a laser, which scans along a line of the frame 100 profile (see FIG. 10) or a camera based sensor S that images an entire region of the frame. Other alternate embodiments utilize tactile or touch sensors S for determining a frame profile. In the exemplary embodiment the sensors S is a visual sensor that monitors a profile of the frame or sash 100. The profiling of the frame member 100 by the sensors in one example embodiment occurs when the frame member 100 is supported in a frame securing assembly 64.

Figure 2:
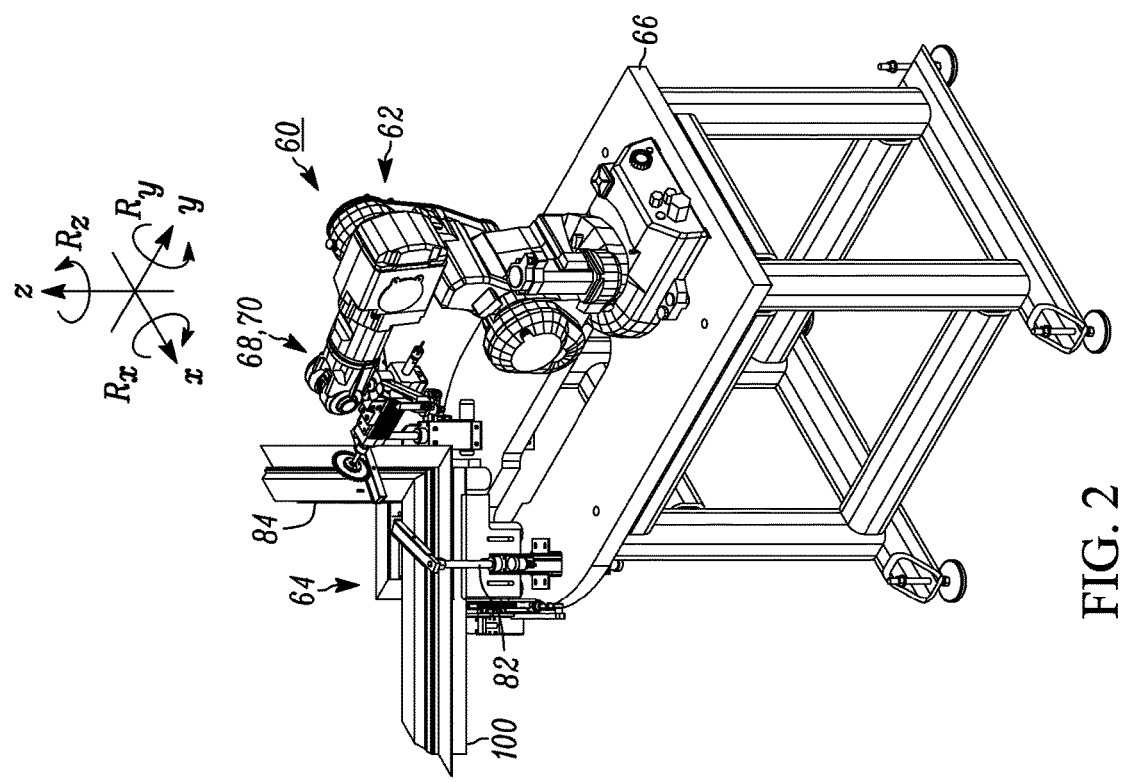
FIG. 2 is a perspective view of a cleaning station in accordance with one example embodiment of the present disclosure.
Figure 5:
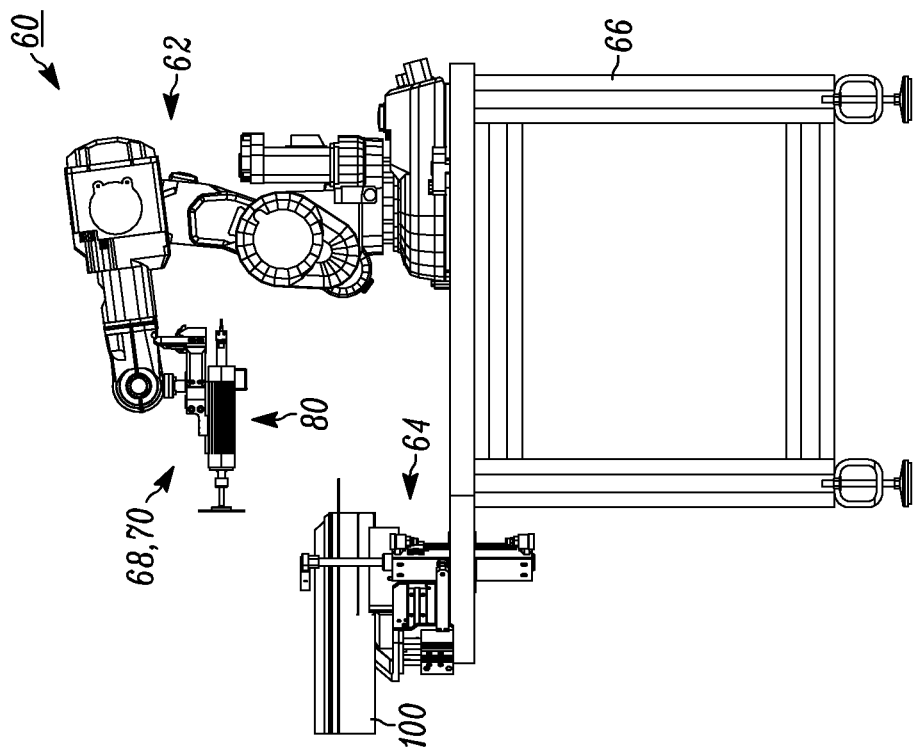
FIG. 5 is a second side elevation view of the cleaning station of FIG. 2.
Figure 4:
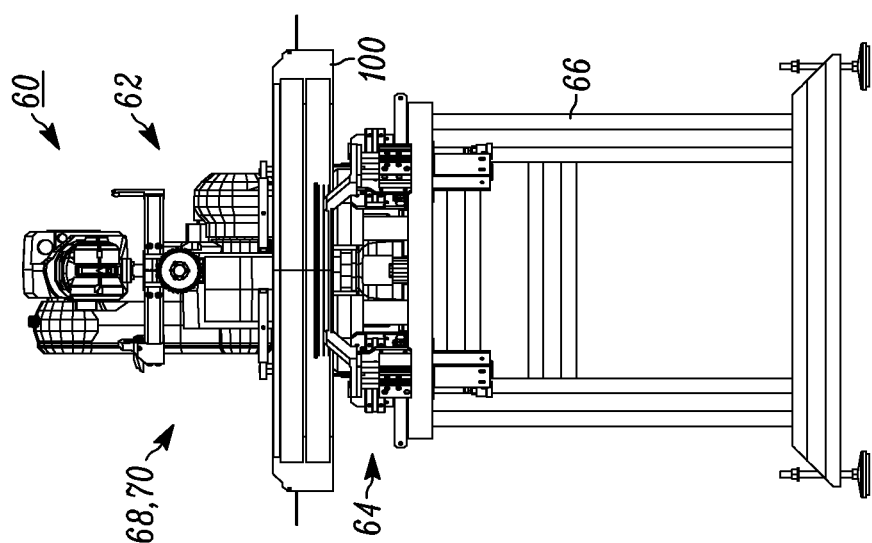
FIG. 4 is a front elevation view of the cleaning station of FIG. 2.
Figure 7:
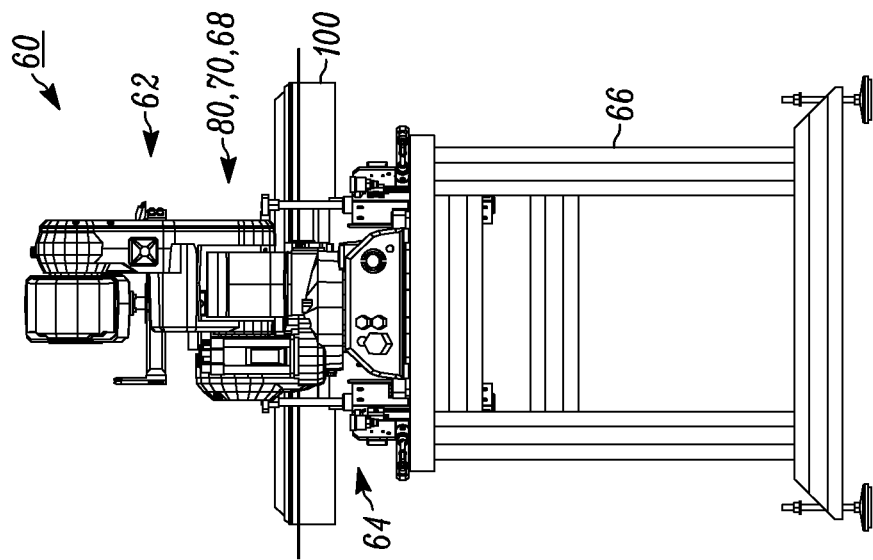
FIG. 7 is a rear elevation view of the cleaning station of FIG. 2.
Figure 6:
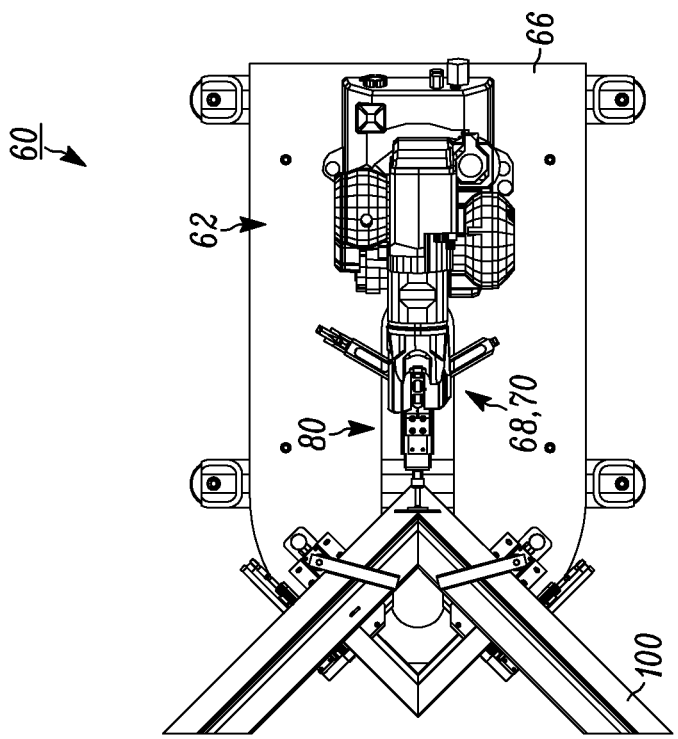
FIG. 6 is a top plan view of the cleaning station of FIG. 2.
Figure 35:
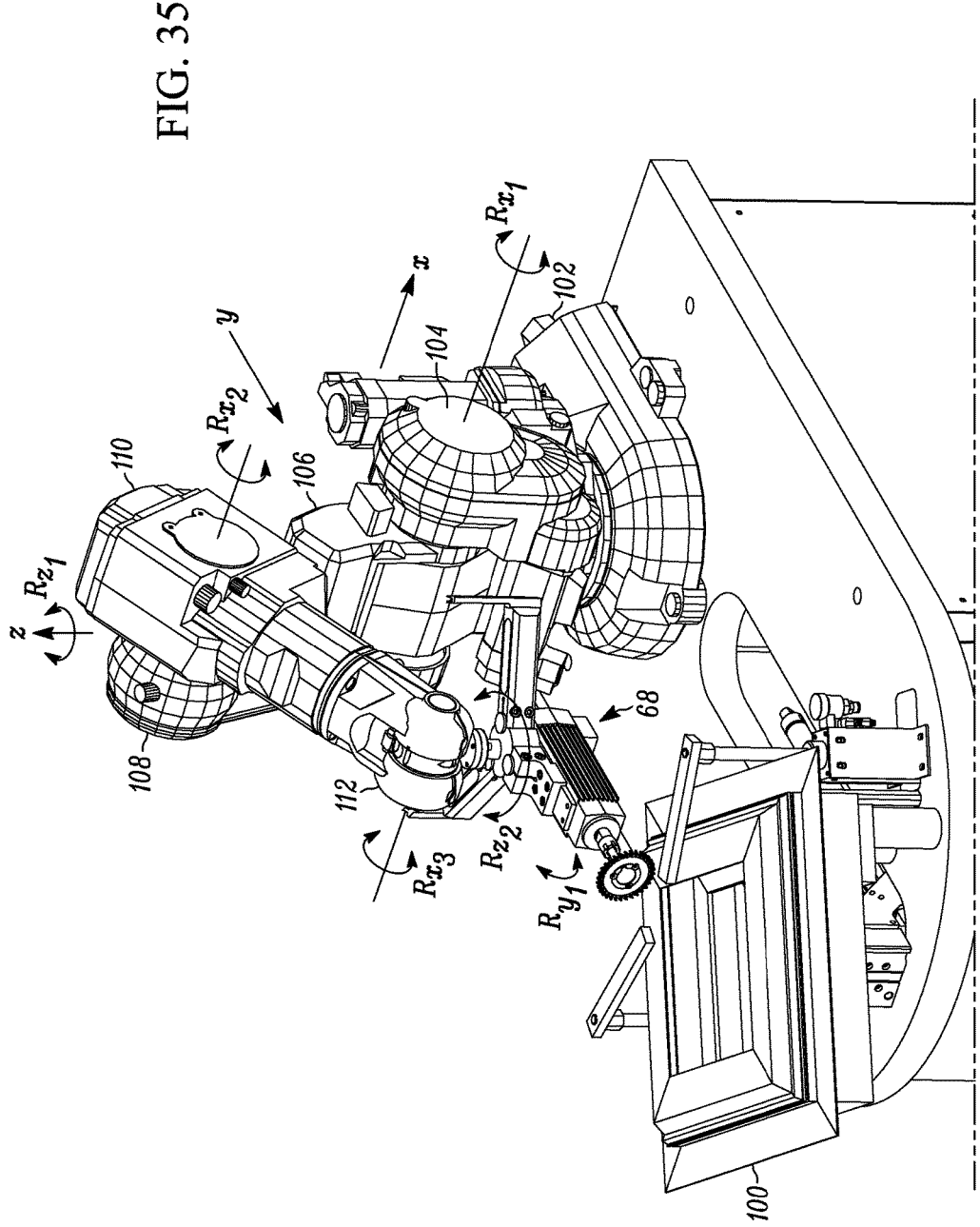
FIG. 35 is a perspective view of the cleaning station operating according to a programmed tool path for cleaning a frame fixture.

In the illustrated example embodiment the articulating arm 62 is a six-axis articulating arm, that is, the arm is capable of translation in the X, Y, and Z axial directions as well rotation about each axis Rx, Ry, Rz, as illustrated by the coordinate system in multiple figures, including FIG. 2. The cleaning station 60 in more detail, as shown in FIG. 35, includes a base 102, first member 104, first arm 106, second member 108, second arm 110, and third member 112. The base 102 rotates about the Z axis and supports the first member 104, first arm 106, second member 108, second arm 110, third member 112, and tool support fixture assembly 68, as illustrated by $Rz_1$. The first member 104 rotates about the X axis and supports the first arm 106, second member 108, second arm 110, third member 112, and tool support fixture assembly 68, as illustrated by $Rx_1$. The second member 108 rotates about the X axis and supports the second arm 110, third member 112, and tool support fixture assembly 68, as illustrated by $Rx_2$. The third member 112 rotates about the X axis and supports the tool support fixture assembly 68, as illustrated by $Rx_3$. Secured to the third member is a coupling 114 that is mechanically attached to the tool support fixture assembly 68. The articulating arm 62 rotates about the Z axis the coupling 114 and tool support fixture assembly 68, as illustrated by $Rz_2$. Each of the plurality of took 80 can be oriented to rotate about the Y axis when operating as illustrated by $Ry_1$. In one example embodiment, the articulating arm is a six-axis arm manufactured by ABB of Zurich, Switzerland sold under part number ABB-IRB140, the datasheet being incorporated herein by reference.

Referring again to FIGS. 2-8, the cleaning station 60 includes a number of clamps and corresponding pins for fixing a frame 100 in place on the support stand 66. For example, the frame securing assembly 64 has fixed clamps or fencing 82 and 84 (FIG. 24) that contact an outer surface of the frame 100 in a region of one corner of a frame or sash. Further details of the fixed clamps 82 and 84 and their operation is found in U.S. Pat. Nos. 8,250,023 and 7,921,064, which are assigned to the assignee of the present disclosure and both patents are incorporated herein by reference in their entireties.

Figure 24:
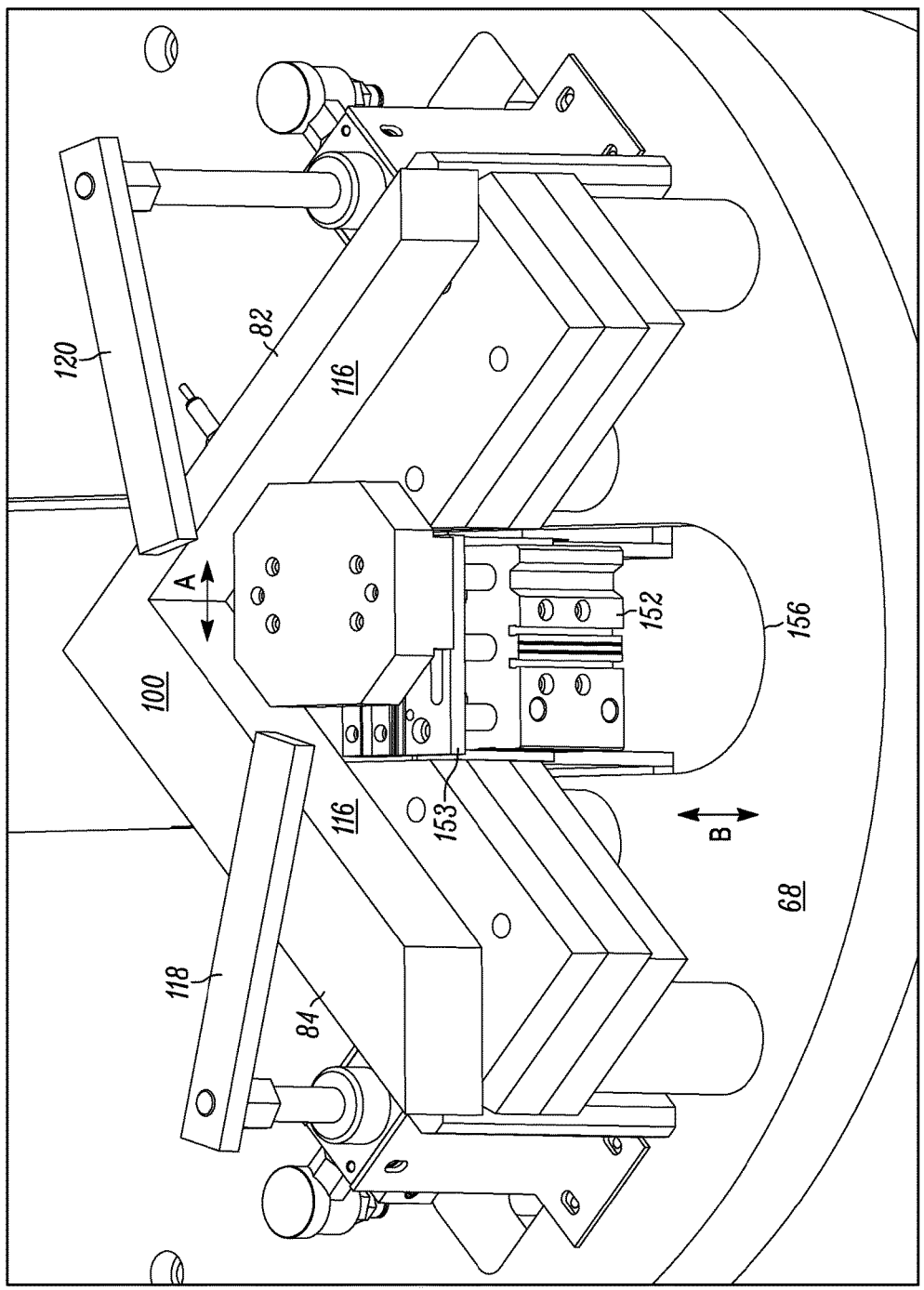
FIGS. 24 and 25 are perspective views of a frame member alignment assembly constructed in accordance with one example embodiment of the present disclosure.
Figure 25:
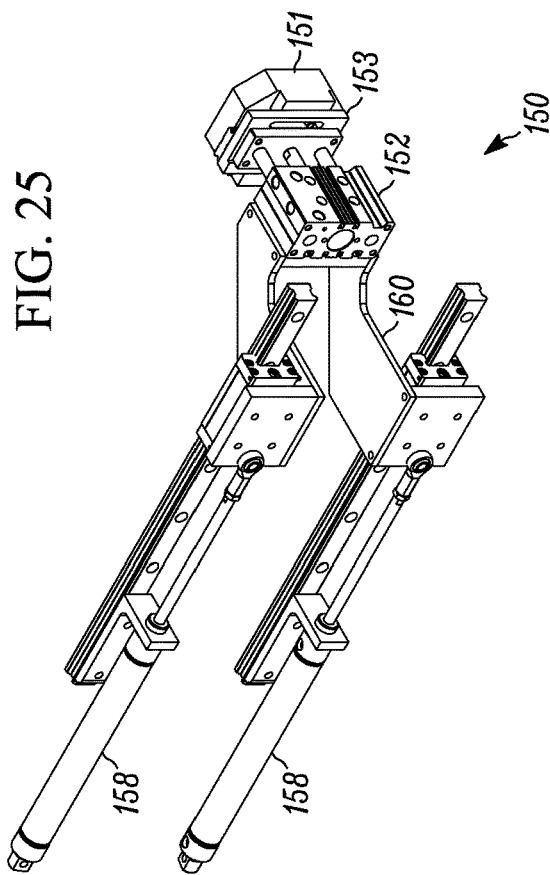
Figure 28:
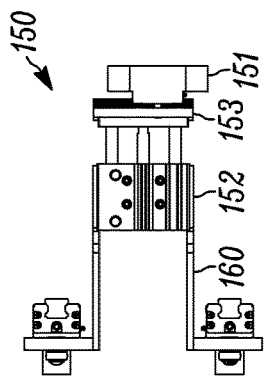
FIGS. 26-28 are various views of FIG. 25.
Figure 26:
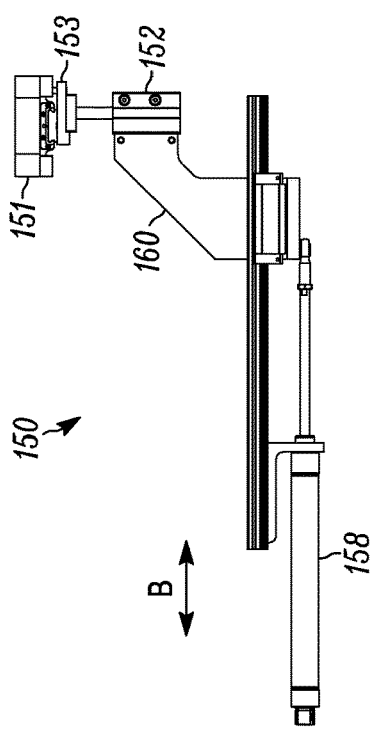
Figure 27:
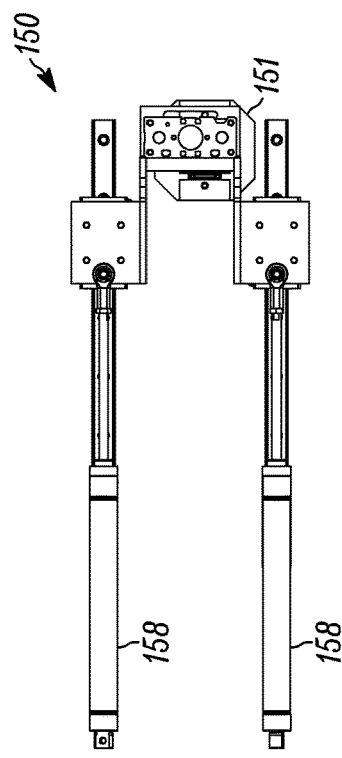

A frame member alignment assembly 150 is illustrated in FIGS. 24-28 and used to hold and align the frame member 100 against fencing clamps 82 and 84. The frame member alignment assembly 150 includes a guide member 151 made in one example embodiment from steel and rides freely on a slotted track 153, as illustrated in FIG. 24. This free movement (indicated by arrows A in FIG. 24) advantageously allows the guide member 151 to compensate and contact different sized inner sides 116 of the frame member 100 until the frame member contacts fencing 82, 84, as illustrated in FIG. 24. Once the guide member 151 pushes the frame member 100 into contact with the fencing, clamps 118 and 120 (FIG. 24) are actuated into contact with the frame member to hold it into position while tike cleaning station performs one or more tooling operations on the frame.

The frame member alignment assembly 150 farther includes the guide member 151 and slotted track 153, both coupled to a vertical cylinder 152 that raises and lowers the guide member into contact position once the frame member is manually or automatically positioned/removed within the cleaning station 60. The vertical cylinder 152 is advanced vertically from a slotted opening 156 in the stand of the tool support fixturing assembly 68. A pair of cylinders 158 are coupled to a weldment 160 actuate the guide member 151 toward and away from the frame member 100 within the slot 156 as indicated by arrows B. The cylinders 158 and vertical cylinder 152 are in communication with controller 35 and sensor S, and accordingly programmed to engage the frame member based on the frame 100 profile.

Figure 11:
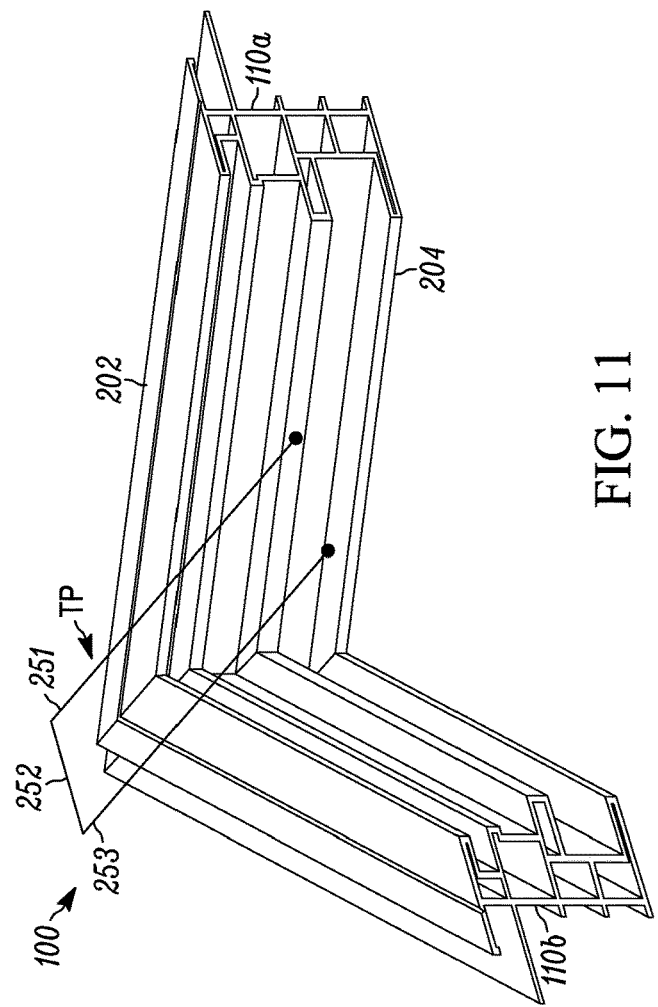
FIG. 11 is a perspective view of two assembled frame or sash members connected at a corner by welding.

The frame member 100 has top and bottom surfaces 202, 204, respectively (FIGS. 10 and 11) that are oriented within the frame securing assembly 64 in a generally horizontal plane with respect to a shop floor. In the example embodiment illustrated in FIGS. 2-8, the cleaning tools 80 of the cleaning station 60 operate on one corner of a frame member 100 at a time. However, illustrated in the example embodiment of FIG. 34, the single cleaning station 60 can clean a plurality of frame members 100 each at respective stations, namely A, B, C, and D, each station having a frame securing assembly 64. The articulating arm 62 rotates between the different stations A, B, C, and D, performing tooling operations on each independently of the other stations and frames 100. It should be appreciated that while the articulating arms and plurality of tooling operations are being performed at any given station, frame members 100 at the remaining stations could be manually or automatically removed, replaced, or rotated with new frame members, allowing constant operation of the tooling 80 without interruption.

Figure 34:
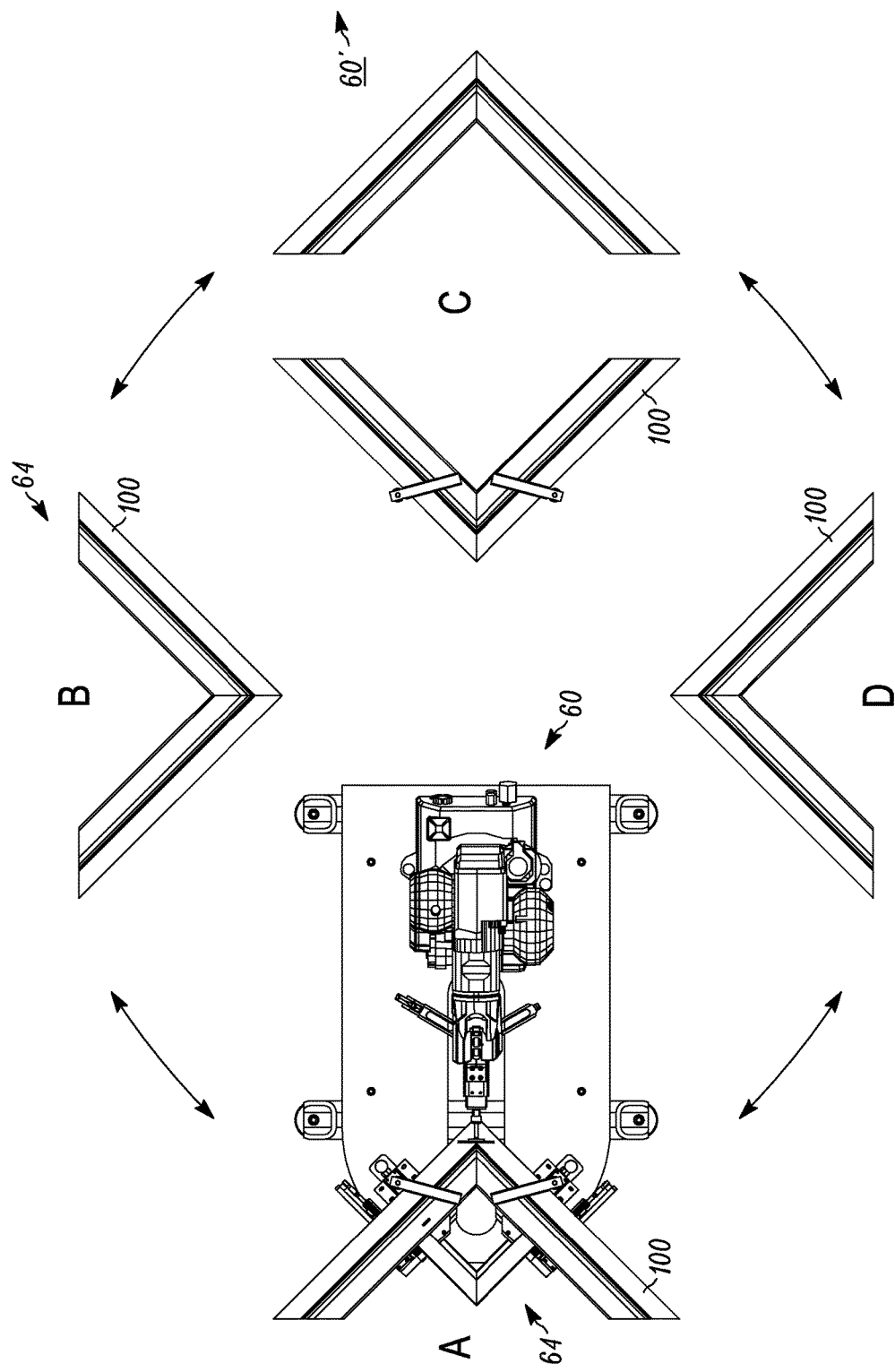
FIG. 34 is a top view of the cleaning station operating on one of four frame fixtures in accordance with one example embodiment of the present disclosure.

It should further be appreciated that other cleaning stations, e.g. 60, similarly constructed could be operating on the remaining corners of a given frame member 100, for example at station C, as illustrated in FIG. 34. In another example embodiment, after a corner of the frame member 100 is cleaned the clamps 82, 84 and guide member 151 are released/retracted and the frame member is lifted by an operator or robot, which reorients the frame or sash for cleaning one of other three corners by the same cleaning station.

Figure 12:
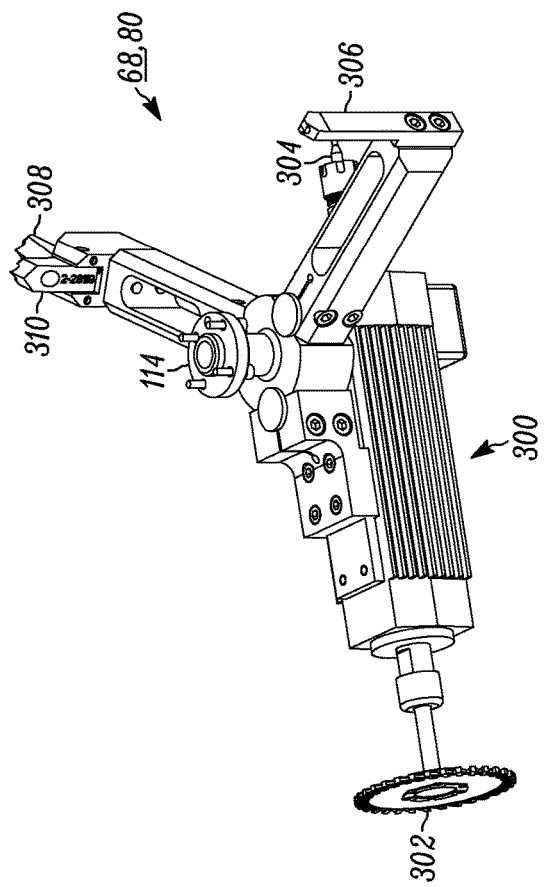
FIG. 12 is a perspective view of a tool support fixture assembly constructed is accordance with one example embodiment of the present disclosure, the tool support fixture assembly holding a number of different tools.
Figure 13:
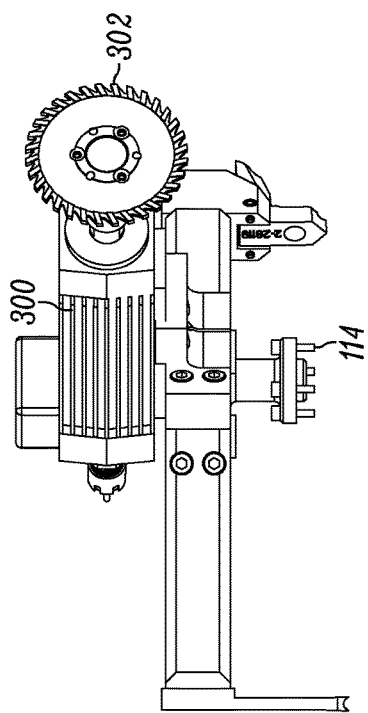
FIG. 13 is a side elevation view the tool support fixture assembly of FIG. 12.
Figure 16:
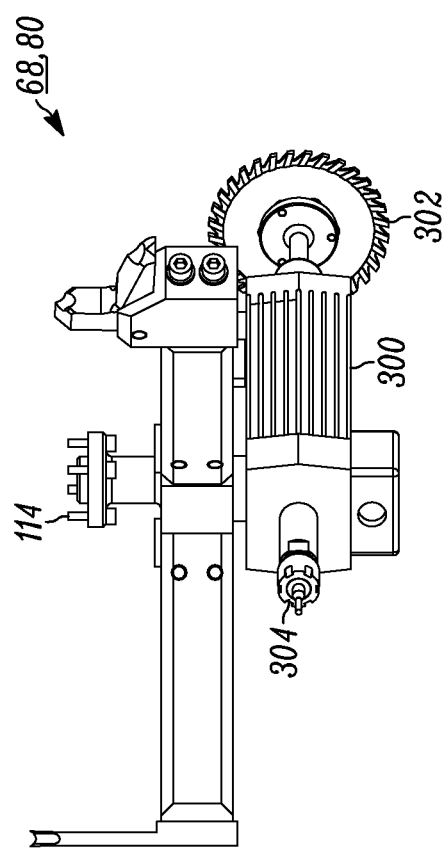
FIG. 16 is as additional side elevation view of the tool support fixture assembly of FIG. 12.
Figure 15:
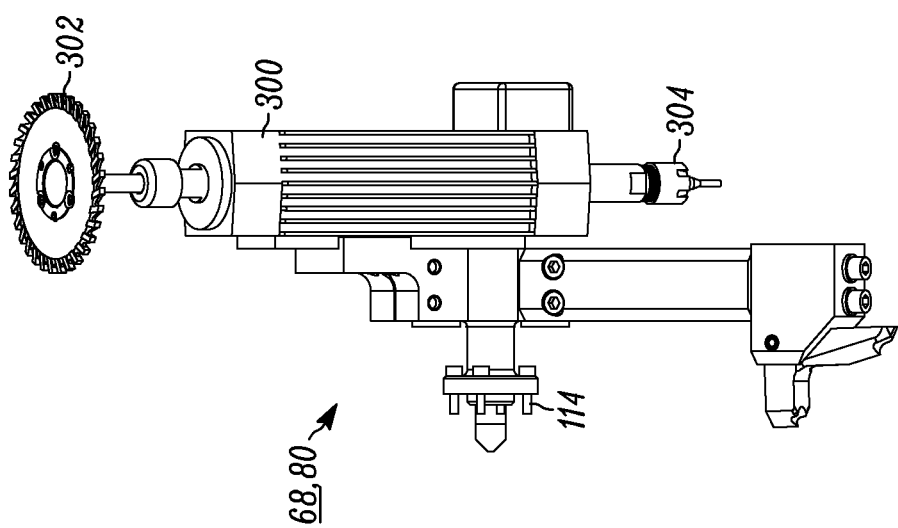
FIG. 15 is an additional side elevation view of the tool support fixture assembly of FIG. 12.
Figure 18:
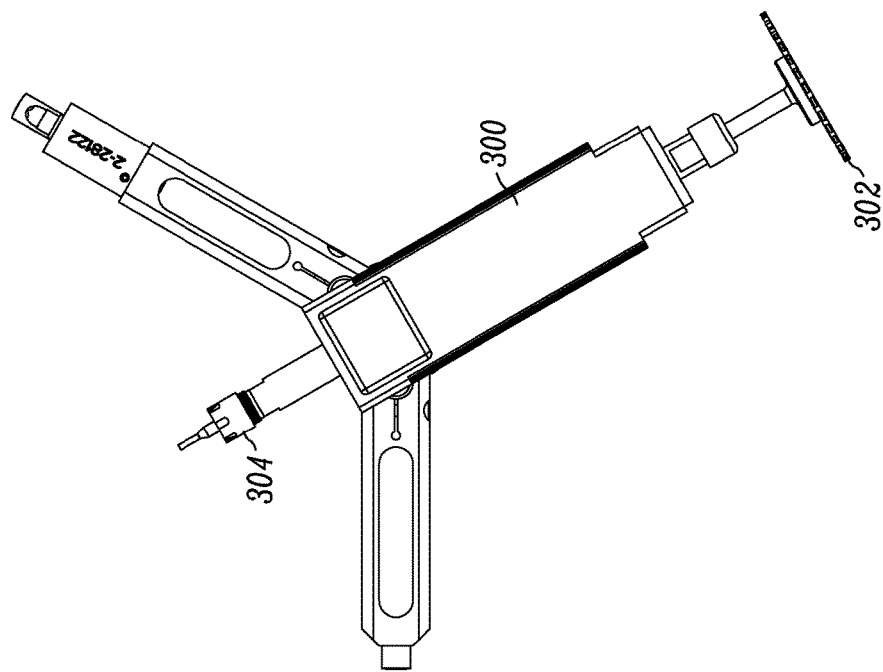
FIG. 18 is a bottom plan view of the tool support assembly of FIG. 12.

The tool support fixture assembly 68 and the plurality of tools 80 shown in the example embodiment of FIGS. 2-8 and 12-18 includes a motor 300 (FIG. 12, either electric or air) having a rotating circular blade 302 at a first end and a router bit 304 at a second end. The motor 300 is operatively coupled to the controller 35. The tool support fixturing assembly 68 and plurality of took 80 further include a knife 306 and first and second shapers 308 and 310 transverse to each other, and in the illustrated example embodiment at approximately 90 degrees.

Figure 37:
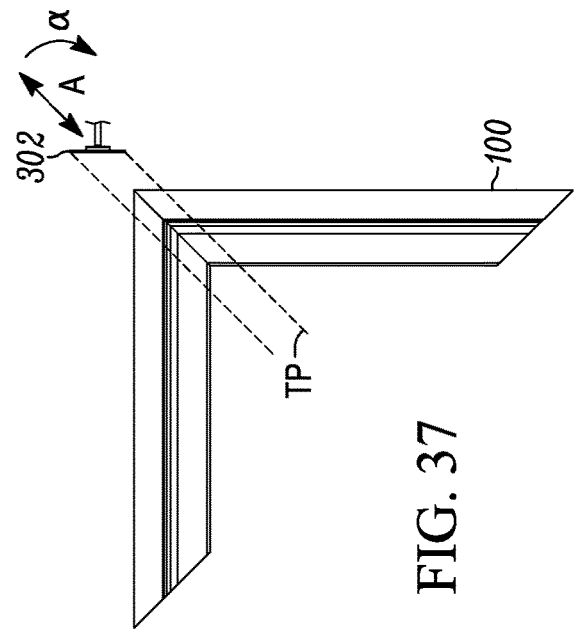
FIG. 37 is a magnified view of a different programmed tool path used by the cleaning station of FIG. 35.
Figure 36:
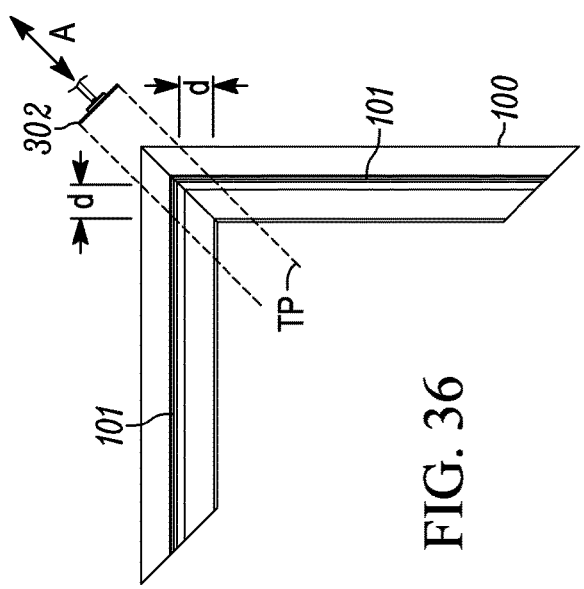
FIG. 36 is a magnified view of the programmed tool path used by the cleaning station in FIG. 35.

As shown in FIGS. 35-37, the saw moves in and out to contact corner locations of the frame member 100 along an outer periphery creating a tool path (TP) illustrated in phantom. The frame member 100 often includes felt or plastic protrusions 101 from which it is desirable that cutting or removal is minimized, while the removal of the bead and/or flattening of the frame surface is maximized. If the tool path crosses the felt or protrusions 101, portions could be undesirably removed, as illustrated as dimension "d" in FIG. 36.

Figure 9A:
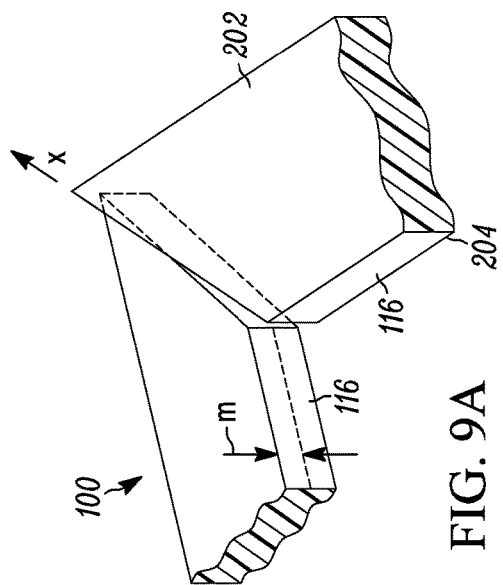
FIG. 9A is a perspective view of a portion of a frame member where abutting sections are misaligned during welding.
Figure 9B:
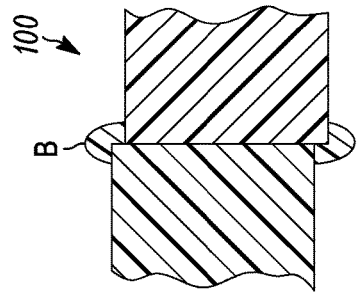
FIG. 9B is a sectional view of a frame member where abutting sections are misaligned and welded together showing a bead B.
Figure 8:
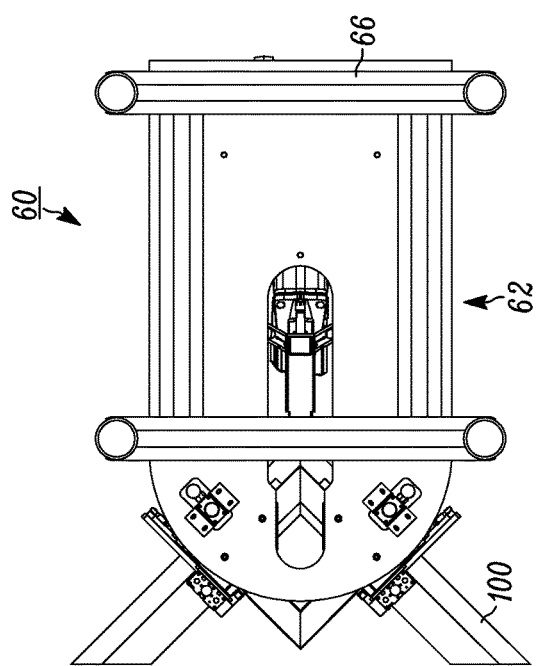
FIG. 8 is a bottom plan view of the cleaning station of FIG. 2.
Figure 9D:
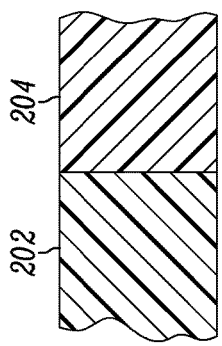
FIG. 9D is a sectional view of a frame member where the bead and corner edges have been cleaned to be parallel or planer on the top and bottom surfaces.
Figure 9C:
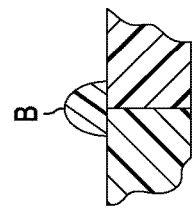
FIG. 9C is a sectional view of a frame member where a bead is formed at a corner of a frame member.

The articulating arm 62 in the present disclosure advantageously allows the saw blade 302 to be rotated at such an angle to minimize removal of the felt, protrusion, or desired material, as illustrated in FIG. 37. This is achieved by rotation of the articulating arm's Z axis rotation $Rz_2$ by the angle α, as illustrated in FIG. 37, as it moves across the frame 100 along tool path TP indicated by arrows A. While performing this movement, the saw 302 contacts and abrades away a bead B of weld flash on the top and bottom surfaces 202 and 204, as illustrated in FIGS. 9B and 9C. The saw and/or router 302, 304 can also remove alignment imperfections shown in FIG. 9A, such that the top 202 and bottom 204 of the frame 100 is made parallel, flat, and/or planer surfaces, as illustrated in FIG. 9D. Such task could be equally performed by the shapers 308, 310, or knife 306, or any combination of the plurality of tools 80, each tool having a different work implement for abrading, cutting, scraping, scarfing, and the like, for the inside or outside of the frame to remove weld flash or uneven surfaces. In one exemplary embodiment, the entire cleaning process of multiple tool 80 operations for a frame 100 can be performed on the order of 20 to 40 seconds.

Figure 29:
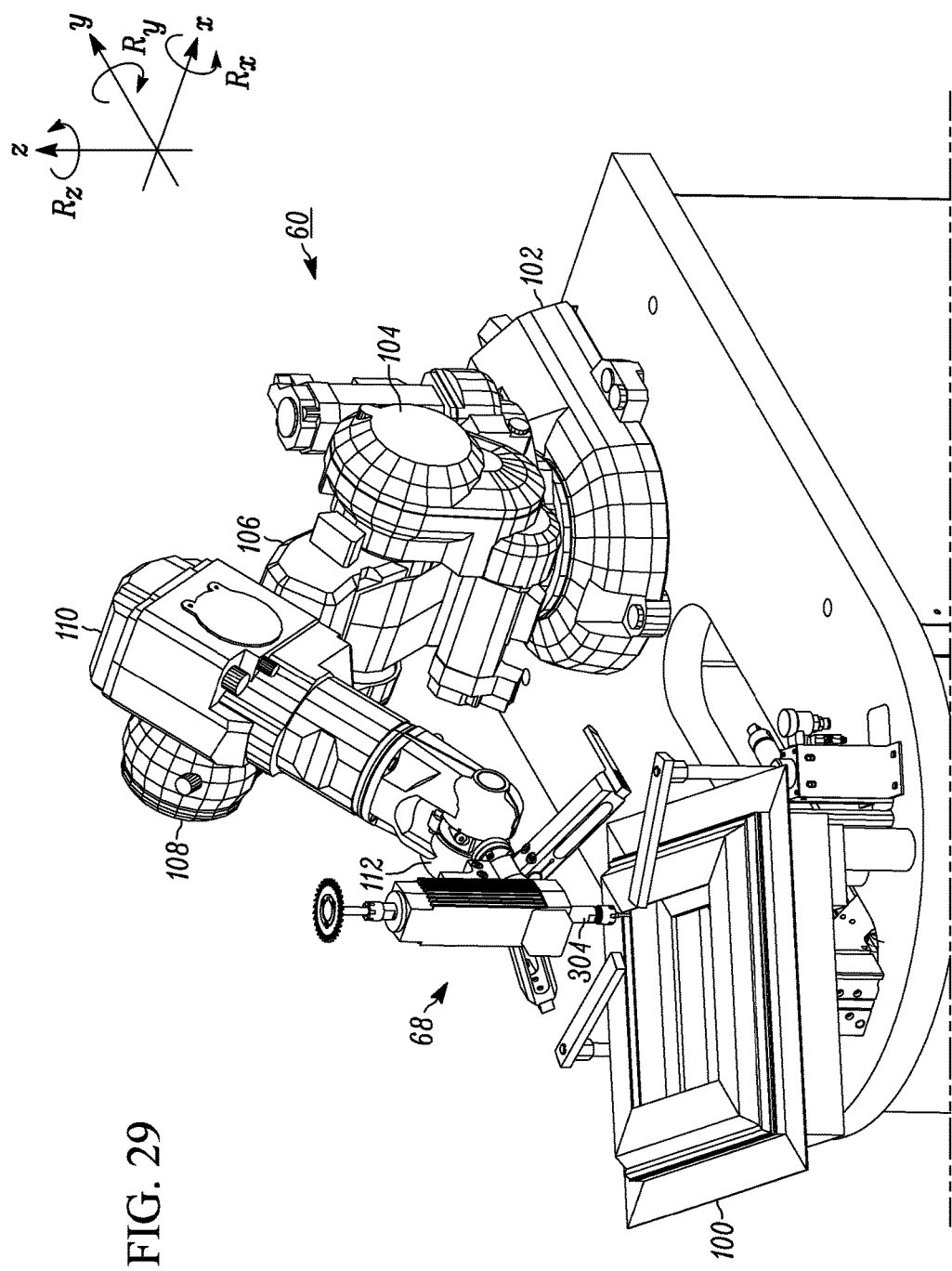
FIG. 29 is a perspective view of a cleaning station using a first tool on a frame member in accordance with one example embodiment of the present disclosure.
Figure 30:
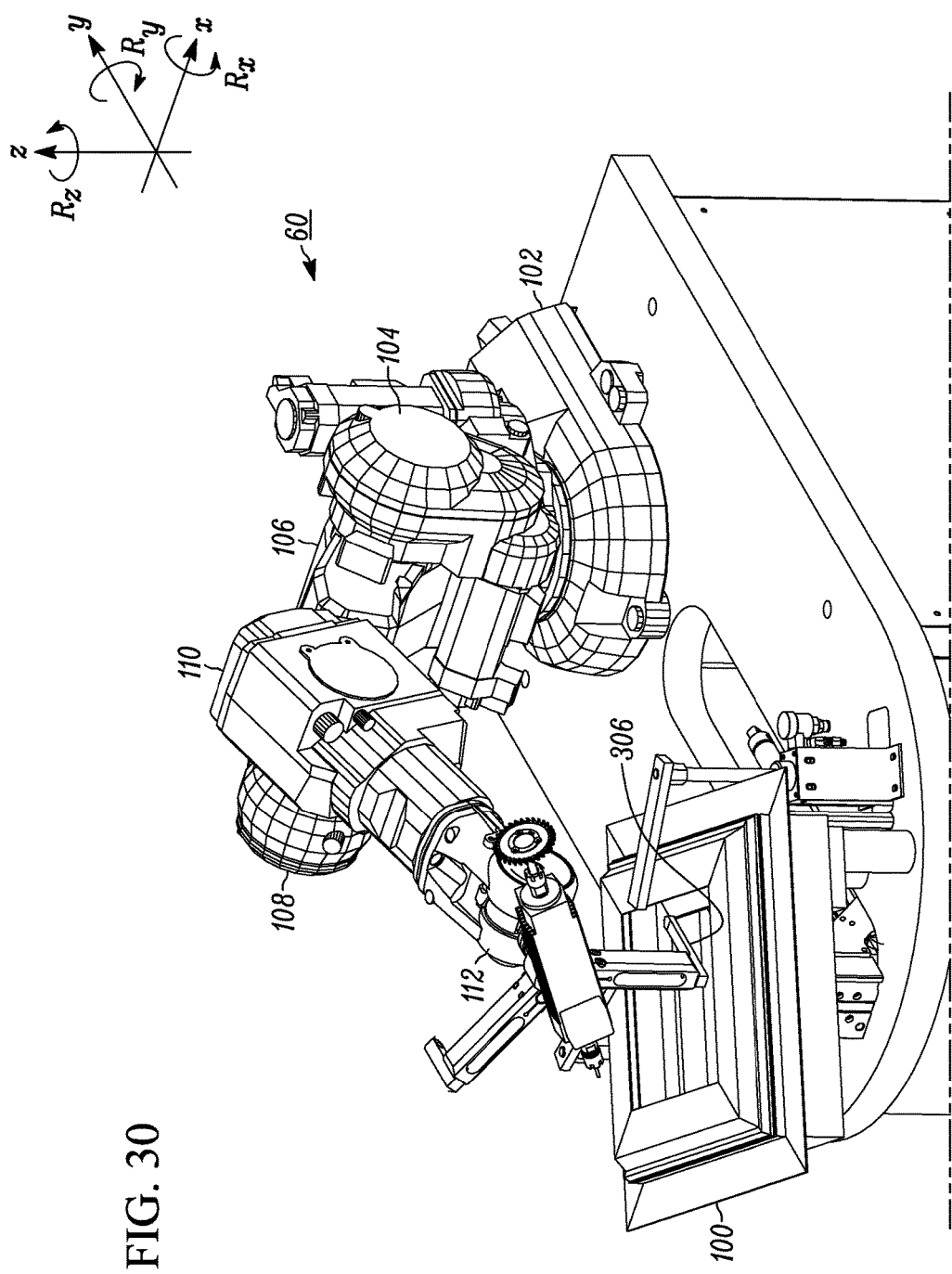
FIG. 30 is a perspective view of the cleaning station using a second tool on a frame member in accordance with one example embodiment of the present disclosure.
Figure 31:
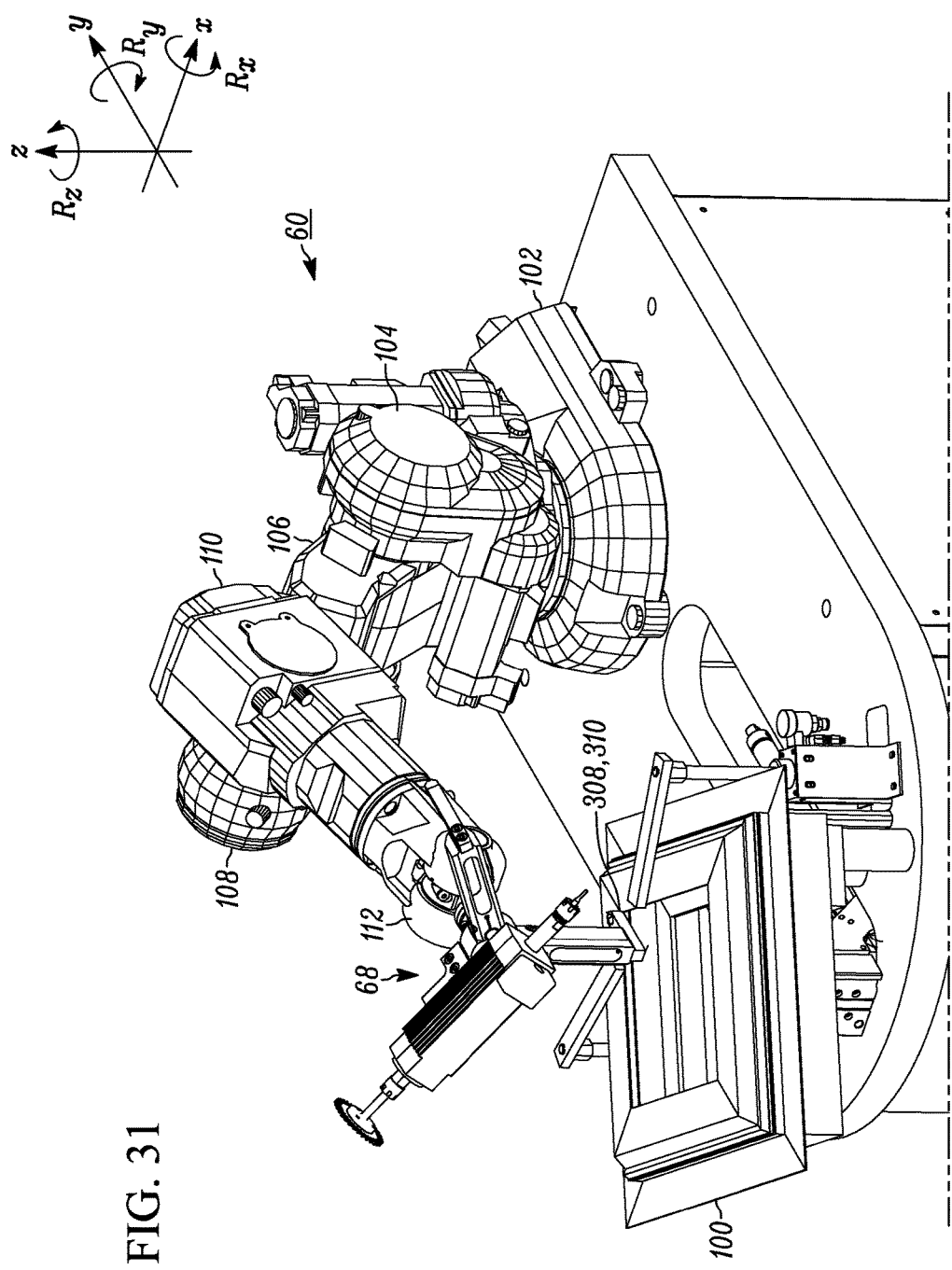
FIG. 31 is a perspective view of the cleaning station using a third tool on a frame member in accordance with one example embodiment of the present disclosure.
Figure 32:
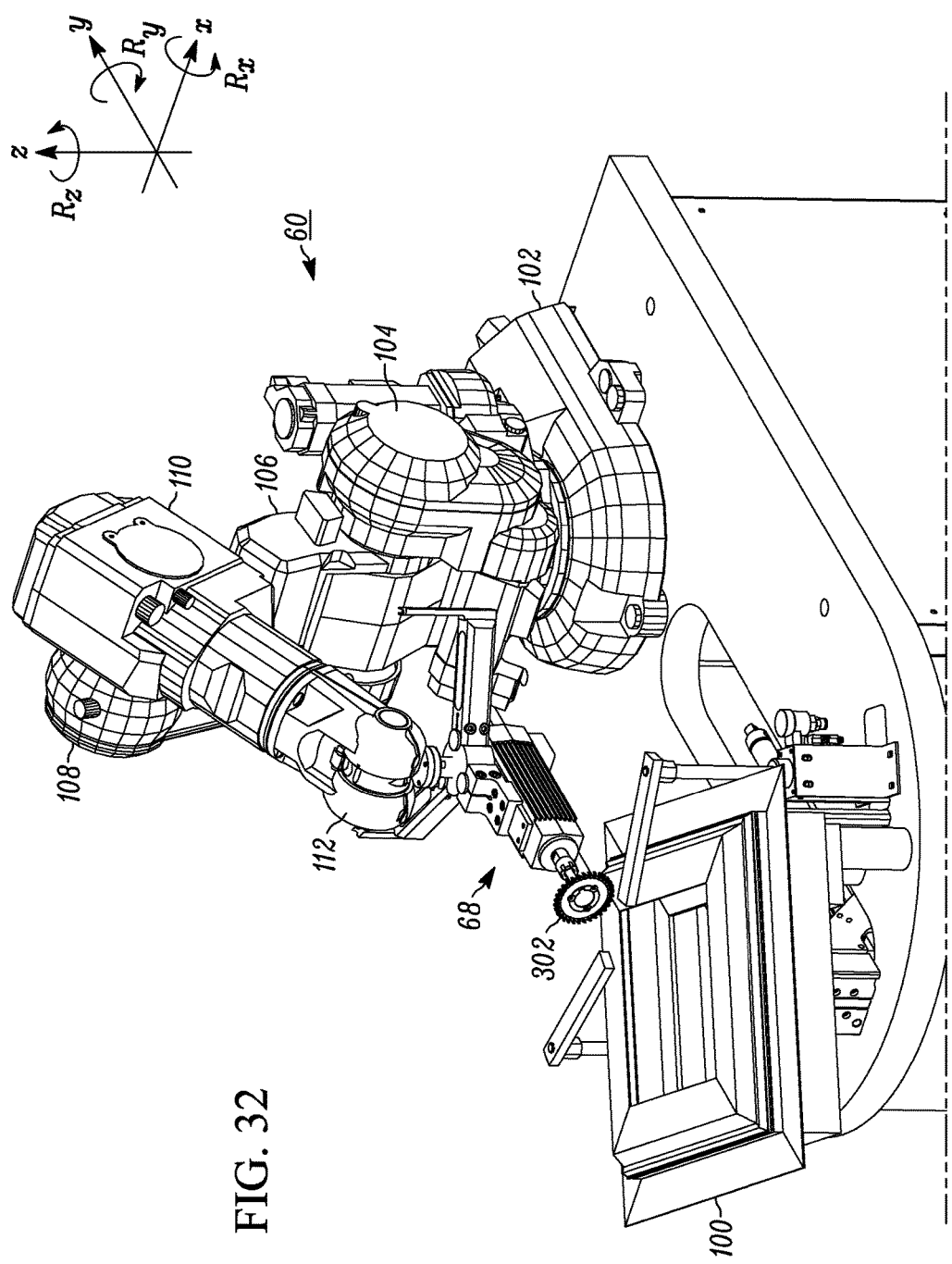
FIG. 32 is a perspective view of the cleaning station using a fourth tool on a frame member in accordance with one example embodiment of the present disclosure.
Figure 33:
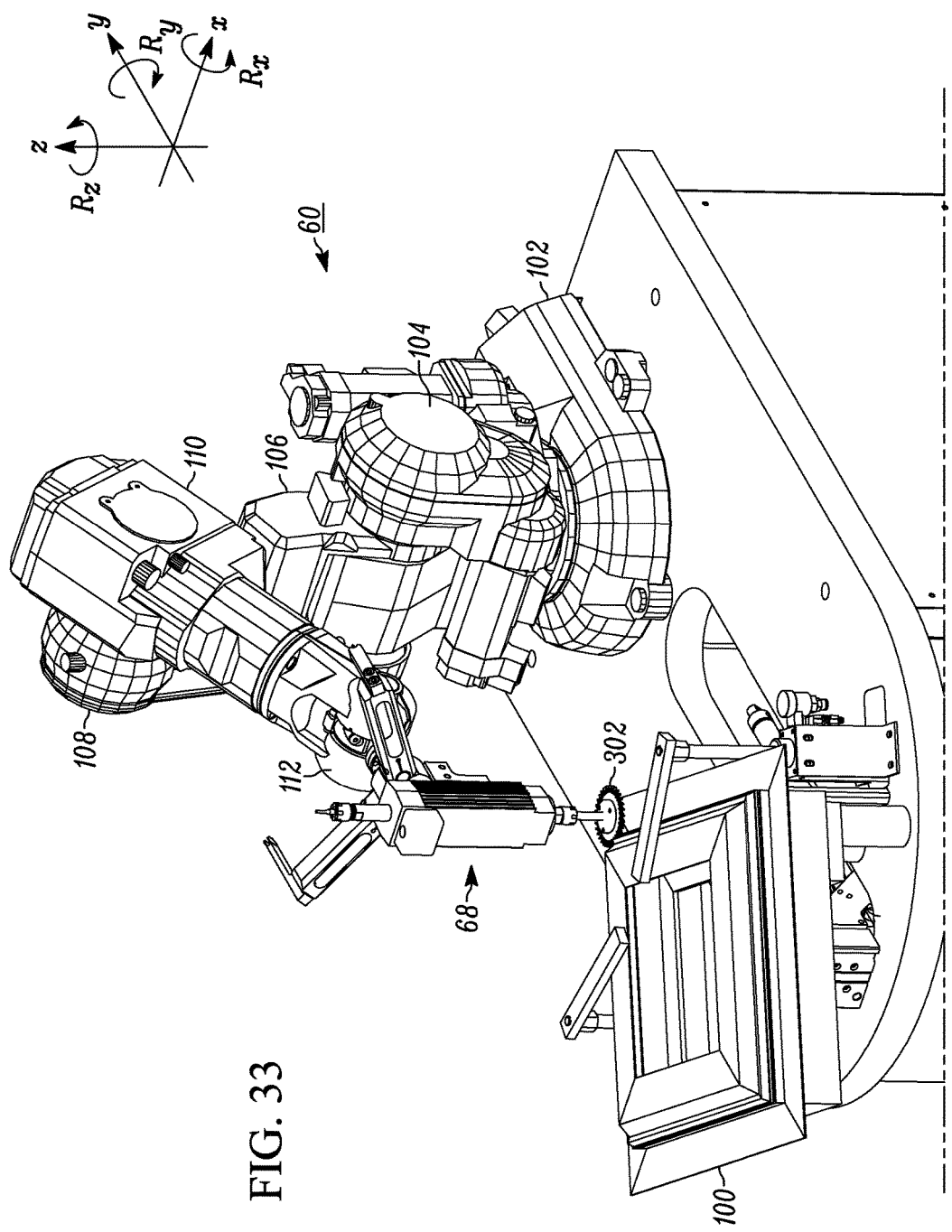
FIG. 33 is a perspective view of the cleaning station using the fourth cleaning tool on a frame member in a different orientation in accordance with one example embodiment of the present disclosure.
Figure 38:
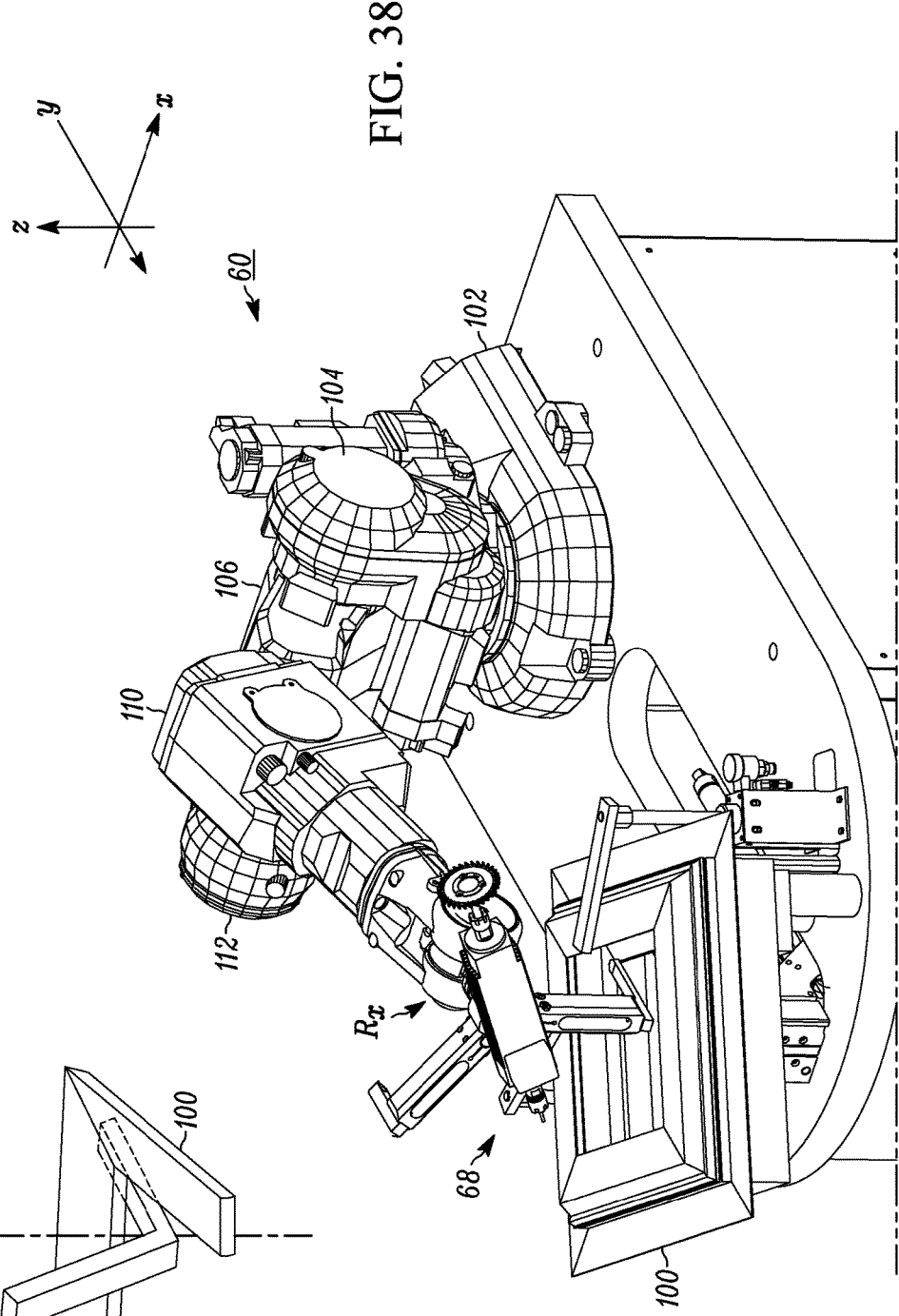
FIG. 38 is a perspective view of the cleaning station operating according to a different programmed tool path for cleaning in accordance with another example embodiment of the present disclosure.
Figure 39:
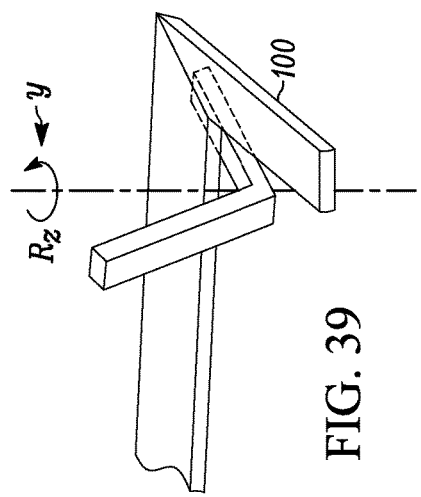
FIG. 39 is a magnified view of the cleaning station of FIG. 38 illustrating the different programmed tool path.

The figures illustrate various tools 80 feeing used by a cleaning station 60 on a frame member 100. FIG. 29 illustrates the use of a router 304, FIGS. 30, 38, and 39 illustrate the use of a knife 306, for cleaning the inside and under inside of a frame member 100. In particular, the arm 62 moves along the Y axis while rotating along the X axis to clean the under inside of the frame 100, as shown in the magnified view of FIG. 39. This controlled and flexible motion was not possible in prior window frame and sash cleaning stations. FIG. 31 illustrates the use of a shaper 308 or 310 on a corner of a frame member 100. FIGS. 32 and 33 illustrate the use of a saw 302 in both a substantially vertical orientation and horizontal orientation, cutting away weld flashing, leveling, or removing undesired portions of the frame geometry.

Figure 19:
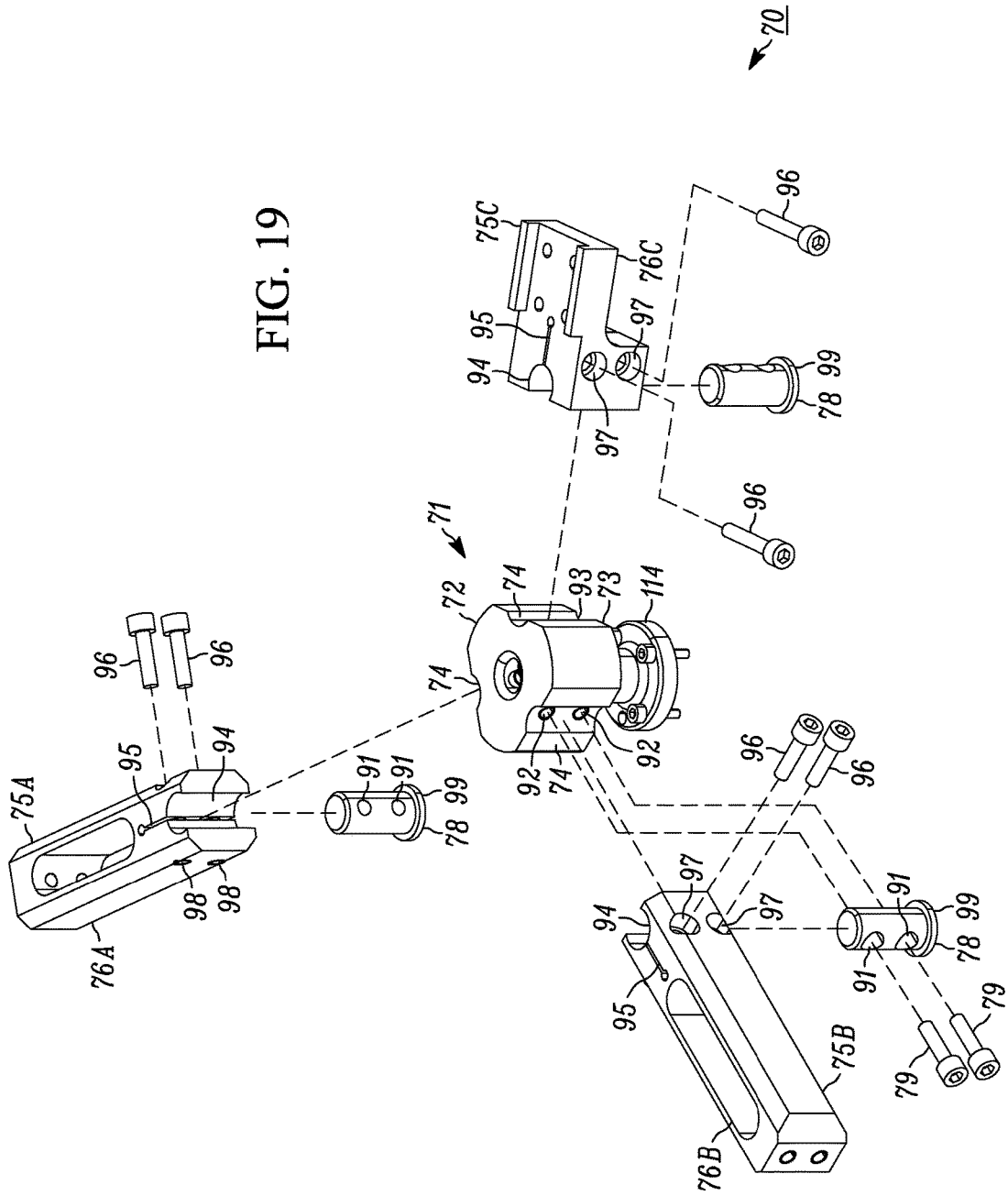
FIG. 19 is an exploded perspective view of a tool fixture arrangement constructed in accordance with one example embodiment of the present disclosure.
Figure 21:
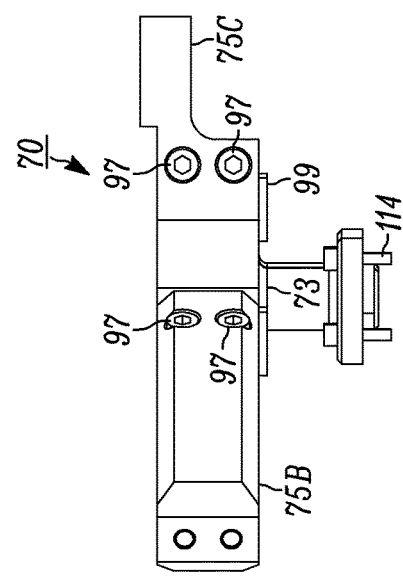
FIG. 21 is a side elevation view of the tool fixture of FIG. 19.
Figure 20:
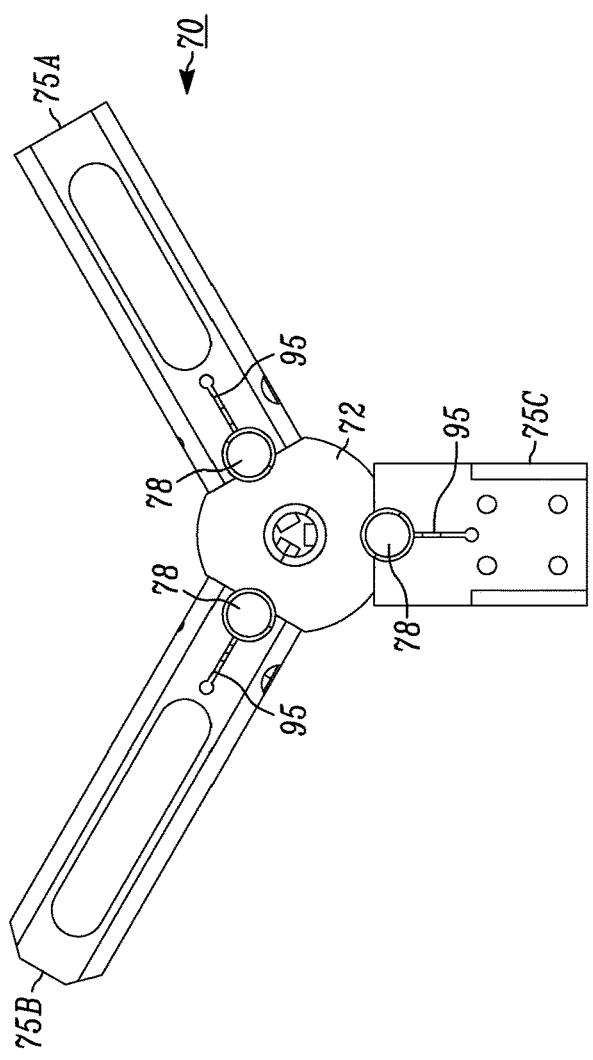
FIG. 20 is a top plan view of the tool fixture of FIG. 19.
Figure 23:
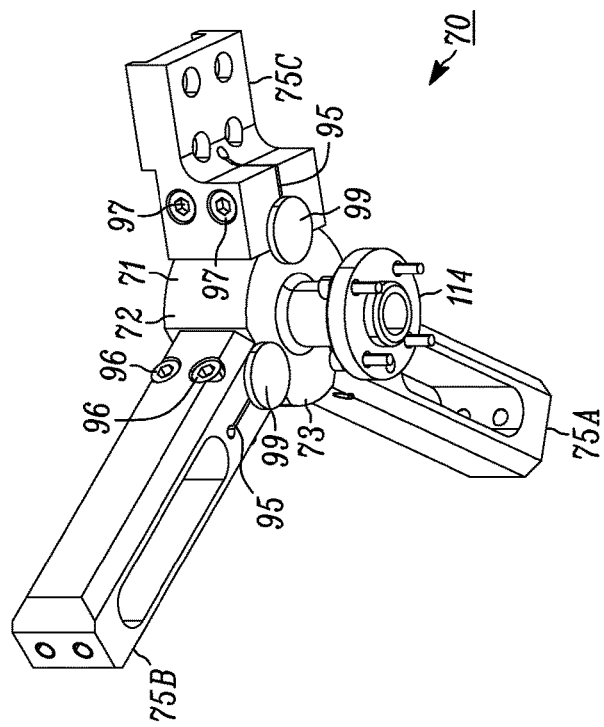
FIG. 23 is a bottom perspective view of the tool fixture of FIG. 19.
Figure 22:
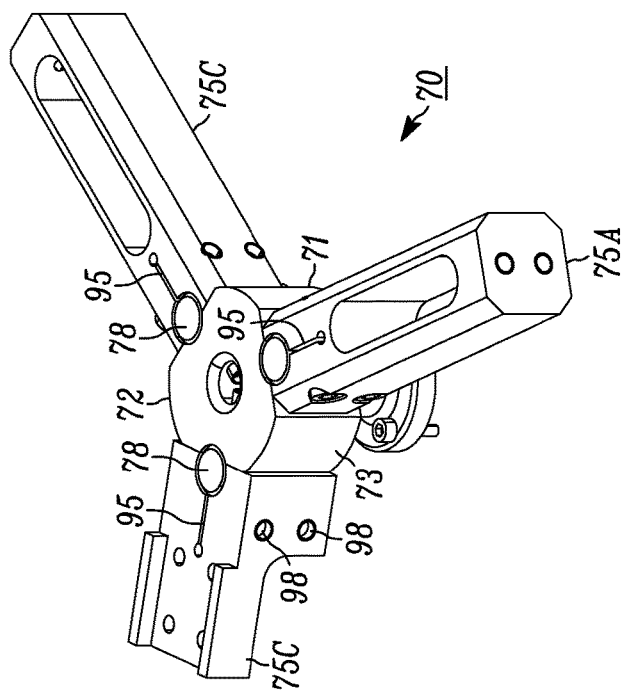
FIG. 22 is a top perspective view of the tool fixture of FIG. 19.

Referring now to FIGS. 19-23, illustrated is a tool fixture arrangement 70 constructed its accordance with one example embodiment of the present disclosure. FIG. 19 illustrates an exploded view of the arrangement 70. The arrangement 70 comprises a body 71 having top 72 and bottom 73 ends spaced by a plurality of faces 74. Extending from each face 74 is a leg 75 for supporting one or more of the plurality of tools 80. In the illustrated example embodiment, the body supports three different legs 75A, 75B, and 75C at a 120 degree spacing about the body. It should be appreciated by those skilled in the art that a greater or fewer number of legs 75 could be supported by the body 71 without departing from the spirit and scope of the present disclosure.

Secured to the bottom 73 of the body 71 is the coupling 114, which during operation is rotatably attached at the third member 112 of the articulating arm 62. Each leg 75 includes a support 76 that includes openings, slides, and/or tapped holes for supporting one or more of the plurality of tools 80 as would be appreciated by one of skill in the art. For example, a support 76C includes a L-shaped bracket for supporting a motor 300, a support 76A attaches first and second shapers 308 and 310, and a support 76B is constructed to hold knife 306. In the illustrated example embodiment, the tool support fixture assembly is constructed of tool steel.

Figure 17:
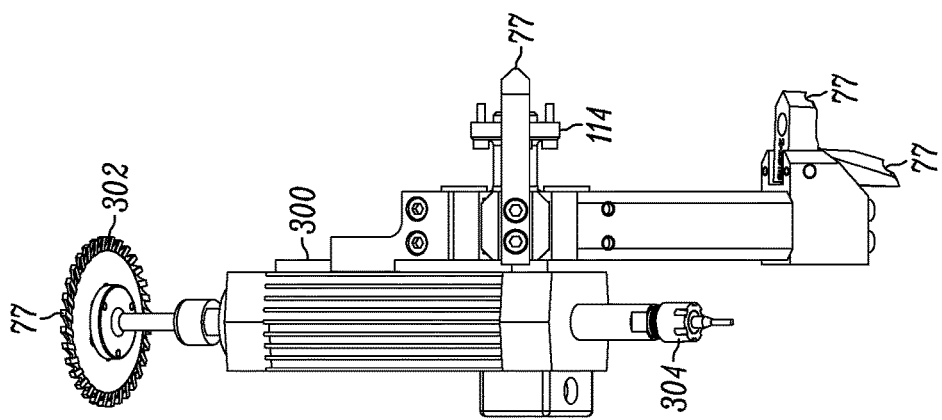
FIG. 17 is another side elevation view of the tool support assembly of FIG. 12.

The tool, fixture arrangement 70 is designed for quick changing of each support 76 and corresponding tool or tools 80 secured thereto. This would be advantageous for necessary changes corresponding to broken tools, dull tools, and product changes requiring a different tool not already on the cleaning station 60. The attachment of the legs 75 to the body 71 is such that a typical change of the removal of the leg and corresponding tool attached thereon can occur with a replacement of a different leg and tool within one minute or less by an experienced job setter. Moreover, the quick change design and construction of the tool fixture arrangement 70 holds a known tool position, such as the tool tip 77 (as illustrated in FIG. 17), within five thousands of one inch (0.005") in all three planes X, Y, and Z defined by the coordinate system in the illustrated drawings and known by the controller 35 for each tool in the plurality of tools 80.

The quick change design of the arrangement 70 includes an arcuate guide 78 for leading each of the legs 75 onto the body 71. The arcuate guide 78 is a ground pin having a high tolerance diameter that is secured by a plurality of fasteners 79 through openings 91 into corresponding tapped holes 92 in the body 71. A corresponding semi-arc profile 93 machined into the body 71 that helps align the arcuate guide 78 along each face 74. Each leg includes a corresponding semi-arcuate recess 94 that encompasses more than 180 degrees for locking to each corresponding arcuate guide 78 during use. Extending from the semi-arcuate recess 94 is a tightening slit 95, for drawing and locking the semi-arcuate recess 94 tightly against the corresponding arcuate guide 78 through side fasteners 96. The side fasteners 96 pass through openings 97 on the a first side of the slit 95 into tapped holes 98 on the opposite side of the slit, drawing the slit closed and locking the guide 78 in the semi-arcuate recess 94 when tightened.

The procedure for removing a leg 75 and corresponding tool(s) 80 from the body 71 is achieved by an operator or job setter by loosening side fasteners 96 so that the tightening slit 95 is released to a state that allows the semi-arcuate recess 94 to be free enough to be lifted off the arcuate guide 78, which is fixedly attached to the body. The procedure for attaching a leg 75 and corresponding tool(s) 80 to the body 71 is achieved by sliding the semi-arcuate recess 94 over the arcuate guide 78, until the recess engages a boss 99 located on one end of the guide. Once the recess 94 is seated on the guide 78, side fasteners 96 are tightened until the semi-arcuate recess is locked to the guide.

Teaching/Compensation

In accordance with the exemplary embodiment, the profile is identified automatically by a sensor or monitor S mounted at the cleaning station 60. In one embodiment the sensor S is mounted to the tool fixture arrangement 70 so that as movement of the tool brings an abrading tool into position relative to the frame, the sensor S is also brought into position for examining the frame or sash 100 currently positioned at the cleaning station. To enable recognition of all available profiles, a profile training or teaching process is performed.

Each frame 100 has multiple recognition features on its outer surface. Turning to the frame depicted in FIGS. 10 and 11, in addition to the top and bottom surfaces 202 and 204, the frame includes other surfaces 206-218, all of which are likely to be disrupted by weld flash at the frame corners that occur during welding. In this depiction for example, the surfaces 210, 211 define outer surfaces of a nail fin for attaching the frame to the structure and the surface 206 defines a lip that overlies siding. Similarly, the surfaces 209, 208 might define surfaces for bounding a screen and the surfaces 214, 216 might define surfaces that bound a sash.

In one exemplary embodiment, the sensor S locates up to six points for each different frame 100 profile and the located points are used by the controller 35 in recognizing the profile. Once the sensor(s) S identifies the profile of the frame member 100, the controller 35 assigns a program for that specific frame profile for the cleaning operation at the cleaning station 60 based on the finger print provided by the profile of the frame member 100. Although a laser sensor is presently preferred, video capture or tactile sensing is also contemplated for use with this disclosure.

Once the controller 35 learns the finger print of frame member 100 profile by the sensors S, the controller 35 prompts the sensor(s) S to the points of interest that will be used to alter the cleaning process performed at the cleaning station 60. This step of adjusting the cleaning is referred to as compensation. There can be just one or many compensation points. These points will be measured every time the corresponding profile has been identified for the different shapes and geometries provided by different frame members 100. A compensation point may also simply use the data from a recognition point.

An inspection process is also implemented as part of the cleaning process at the cleaning station 60. The inspection process is performed by recording the min and max readings as the sensors S are moved across the cleaned joint between the two adjoining sides of a frame member 100. Ideally, this variance is minimized by the cleaning process.

Figure 41:
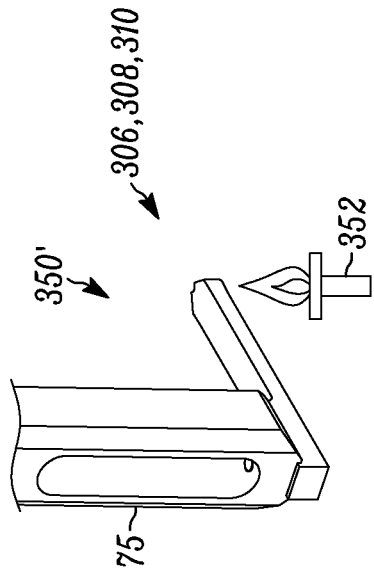
FIG. 41 illustrates another example of a heating operation.
Figure 40:
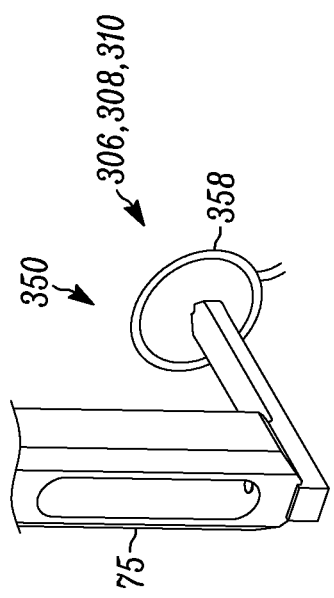
FIG. 40 illustrates one example of a heating operation.

Illustrated in FIGS. 40 and 41 are partial perspective views of a leg 75 that forms part of a tool support fixture assembly 68. In particular, the leg 75 supports one of shapers 308 or 310, or a knife 306. In the illustrated example embodiment of FIGS. 40 and 41, the design addresses issues relating to reducing the force and torque imposed on the articulating arm 62. High levels of force and torque for the arm assembly 62 are of particular concern on shaping and knife cutting operations on the window or frame member 100.

Testing of the arm 62 advantageously revealed that if the tool 306, 308, and 310 is heated at a heating station 350, the force required to cut or shape the window frame 100 is reduced by a ratio of four to one 4:1. That is, a shaping operation on the frame that without heat would require on average sixty-five (65) pounds of force. By pre-heating the tool 306, 308, and 310, the required force to perform a cleaning operation such as shaping or cutting was reduced to twenty (20) pounds of force.

FIG. 40 illustrates one example embodiment of a heating station 350 that includes induction heating of the tool 306, 308, and 310 by induction rings 358 from which the tool enters until reaching a prescribed/programmed temperature in the controller 35 as measured and transmitted to the controller by sensor S. FIG. 41 illustrates another example embodiment of a heating station 350' that includes flame or gas heating of the tool 306, 308, and 310 by a flame 352 until the tool reaches a prescribed/programmed temperature in the controller 35 as measured and transmitted to the controller by sensor S. In one example embodiment, the tools 306, 308, and 310 are heated by a heating station 350' until the tool temperature reaches 100 to 300 degrees Fahrenheit. It should be appreciated that the heating station 350 could also include thermal resistive heating and the like.

In another example, a unit to corner clean welded vinyl frames and sashes is provided with two servo controlled robotic articulating arms. As described above with respect to, e.g., FIGS. 2-8, each articulating arm has a tool turret installed to operate with a plurality of tools to aid in the cleaning process. Example tools include a saw disk, a router bit, as well as horizontal and vertical knives.

Raw Program

After the frame or sash is welded together, the articulating arm 62 can use one or more tools mounted to the arm to perform various cleaning operations that, for example, remove left over flash from the frame or sash. The controller 35 (e.g., a Programmable Logic Controller) can cause the articulating arm 62 to move in a number of different directions to support cleaning operations on frames or sashes of many different sizes and profiles according to one or more parameters defined in a raw program. For example, the parameters can relate to X, Y, Z coordinates of the tool path (e.g., indicating points along the direction of the tool path and/or end points of the tool path). In other examples, the parameters can relate to a speed traveled by the tool along the tool path. Examples of different tool paths that the articulating arm 62 can follow with different tools are show in FIGS. 36 and 37, which depicts a linear tool path TP for a saw 302 in cleaning a corner region of a frame.

To control the cleaning, a profile with specific parameters can be selected (either by an operator or automatically) so that the controller 35 causes the articulating arm 62 to perform a specific sequence of movements or steps proper for cleaning the given frame or sash. A typical tool path implemented by the articulating arm is formed by a sequence of shorter travel path segments that in combination make up the tool path. Example cleaning methods are shown and described in U.S. Pat. Nos. 8,250,023 and 7,921,064, which are assigned to the assignee of the present disclosure, and both patents are incorporated herein by reference in their entireties.

Within the profile, the raw program includes one or more parameters that the controller uses to control the movement of the articulating arm. The controller 35 includes embedded application specific software, which can include or be based on the raw control program. The raw program can include one or more specific parameters that define the tool path that the articulating arm 62 follows when using one of the various tools. For each different tool or each different frame, a profile within the raw program includes a number of different parameters that control the tool path.

Programming Pendant

Figure 42:
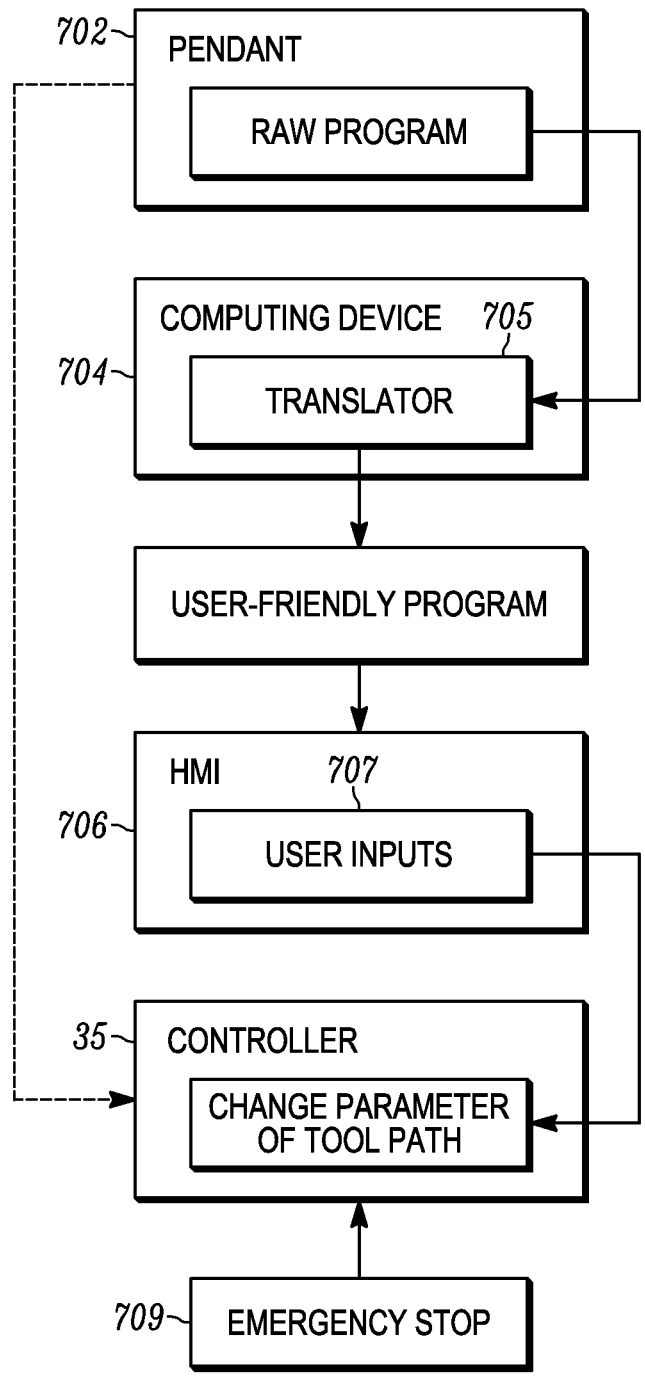
FIG. 42 is a schismatic diagram of an example of hardware that can be used to implement a file translator system, according to an embodiment.

As shown by the dashed line in FIG. 42, the controller 35 can communicate with a programming pendant 702 (or other robotic programming utility), which can be used to view/edit settings and parameters within the raw program. One suitable pendant is provided by ABB with the articulating robot arm for use in programming a sequence of movements. In some cases, an operator may need to adjust one or more parameters governing the tool path to clean a given sash or frame. In such cases, the operator can edit the raw program on the pendant 702. This edit is transmitted along the dashed line of FIG. 42 to the controller 35, and the change is implemented by the controller 35.

However, the editing on the pendant 702 may not be intuitive for the operator, who may not be familiar with the layout of the raw program or the means for editing the raw program using the programming pendant 702. As an example, the programming pendant 702 can include a graphical human machine interface (HMI) that can be used for reading, as well as changing, parameters that serve to operate the articulating arm 62. However, the changing of the parameters can be an arduous and error prone task for operators that are unfamiliar with the programming language of the raw program.

For example, a raw program used by an ABB robotic system to control movements of the articulating arm and tooling operations of the plurality of tools exists in a computer readable file format (CNC program), which may be difficult for an operator to read and understand, and, therefore, not conducive to editing via the programming pendant 702.

File Translator System

An exemplary file translator system provides an alternate way for the parameters of the raw program to be adjusted or modified and furthermore limits the changes made in this alternate programming capability. As an example, the file translator system provides a user-friendly way for a user to edit the different settings and parameters of the raw program. As shown in FIG. 42 (unbroken lines), the raw program can be taken from the programming pendant 702 and translated by a computing device 704 into a user friendly program implemented by a software module 705, which can be displayed to the operator by a graphical human machine interface 706. The translated user-friendly program can be used by the operator to change the parameters of the raw program. The user-friendly program, which is displayed on the human machine interface 706, can receive one or more user inputs, which are fed to the controller 35 to change the one or more parameters of the raw program to control the articulating arm 62. The file translator system enables an operator without knowledge of the mechanics of the raw program, but knowledge of different manipulations that need to be made to the tool path for the specific product being cleaned, to make specified changes to the parameters in the raw program.

The raw program provided fey the pendant lacks a way to easily edit the raw program. In contrast, the disclosed file translator system provides a simple interface for an operator to use when modifying the program, with limits that indicate what level of adjustments of the arm and tools are still safe. Moreover, the tool path of the raw control program is sequentially based so that it is executed in the order in which it is stored on the controller 35 providing a clear reference to operations performed with the individual tools.

Implementation of the file translator system allows an operator with minimal knowledge, and training of the raw code, but at least a working knowledge of the functionality of the cleaning process, to adjust one or more parameters of the raw program using the HMI 706. As an example, the file translator system enables an operator of the articulating arm 62 to recover the position of the tools during the cleaning process with minimal knowledge or training on a robot, as well as the ability to edit a tool path with simple commands from the operator interface (e.g., HMI 706), to enable flexibility in customizing the use of the articulating arm 62. Moreover, although the file translator system can be described in use as an "off line" process, the file translator system can be modified to launch automatically when a new raw program is created and used on the same or different programming pendant 702.

Translator

The computing device 704 of the file translator system reads the raw program created by use of the programming pendant 702 and parses the raw program into individual translated modules. In the exemplary embodiment, the computing device 704 translates the raw program by identifying comments to each of the various portions parsed from the raw program. For example, in the exemplary system, a different comment (e.g., designed by a leading ! character) is added at the manufacturing facility where the cleaning system is fabricated by one familiar with programming using the pendant to each software module of the raw program. This comment identifies the functionality of the software module for the translator program. The comments can include a reference to the window frame profile, the tool and/or the functionality of the module (examples shown in element 368 of FIG. 44). The translated raw program can be used to create a user-friendly program that is used by the HMI 706 to receive user inputs related to parameters of the raw program.

Human Machine Interface

The human machine interface 706 displays a tool path edit screen 470 (FIG. 48) that is user friendly and is derived from information contained in the translated program. User inputs of parameters are fed to the controller 35 to change the respective parameter of the tool path. The tool path edit screen can include a selection of a profile, the portion of the frame or sash to be cleaned, the tool to be used, clamping operations, and/or various options related to the parameters of the tool path. For example, the options related to the parameters of the tool path can include a step forward function, a step backward function, current coordinates values, and new coordinates values (based on a user input and bound by maximum variations). The operator can change one or more of the current coordinates values bounded by limits defined by the specific profile of the raw program. For example, the change can be bound by a threshold value that is a maximum safe adjustment (assured not to damage the frame or sash and/or the articulating arm 62 or other machinery).

Accordingly, the file translator system described herein addresses the problem of the operator damaging the machinery or the product due to an inability to implement changes properly. An exemplary system constructed in accordance with the present invention limits the operator adjustments in the X, Y, and Z plane (or any other plane) to incremental Increase and decrease, relating to direction. In some examples, the adjustments can also relate to an incremental increase or decrease of the speed of the tool as it travels across the tool path. This restriction limits potential damage that can occur to the window frame or sash (product) and/or the articulating arm (robot). As an example, the HMI of the system can provide for small adjustments in endpoint position (e.g., 0.001 mm, 0.01 mm, 0.1 mm, 1 mm, and the like). If the adjustment fells beyond a threshold (previously set that depends on the size of the frame, but it may be 2.5 mm in any direction), the HMI will generate an error and not allow the adjustment. Stated another way, the commands for moving the articulating arm are defined in the control program and stored in memory and cannot be selected or modified, but the start and end points of tool movement can be adjusted, bound by a threshold for the adjustment (chosen or pre-set for each adjustment based on a safety consideration). The file translator system can also provide the ability to direct the tool along a reverse path during recovery from an emergency stop (E-Stop) of a machine or a system, malfunction without the danger of damaging the tools.

Figure 48:
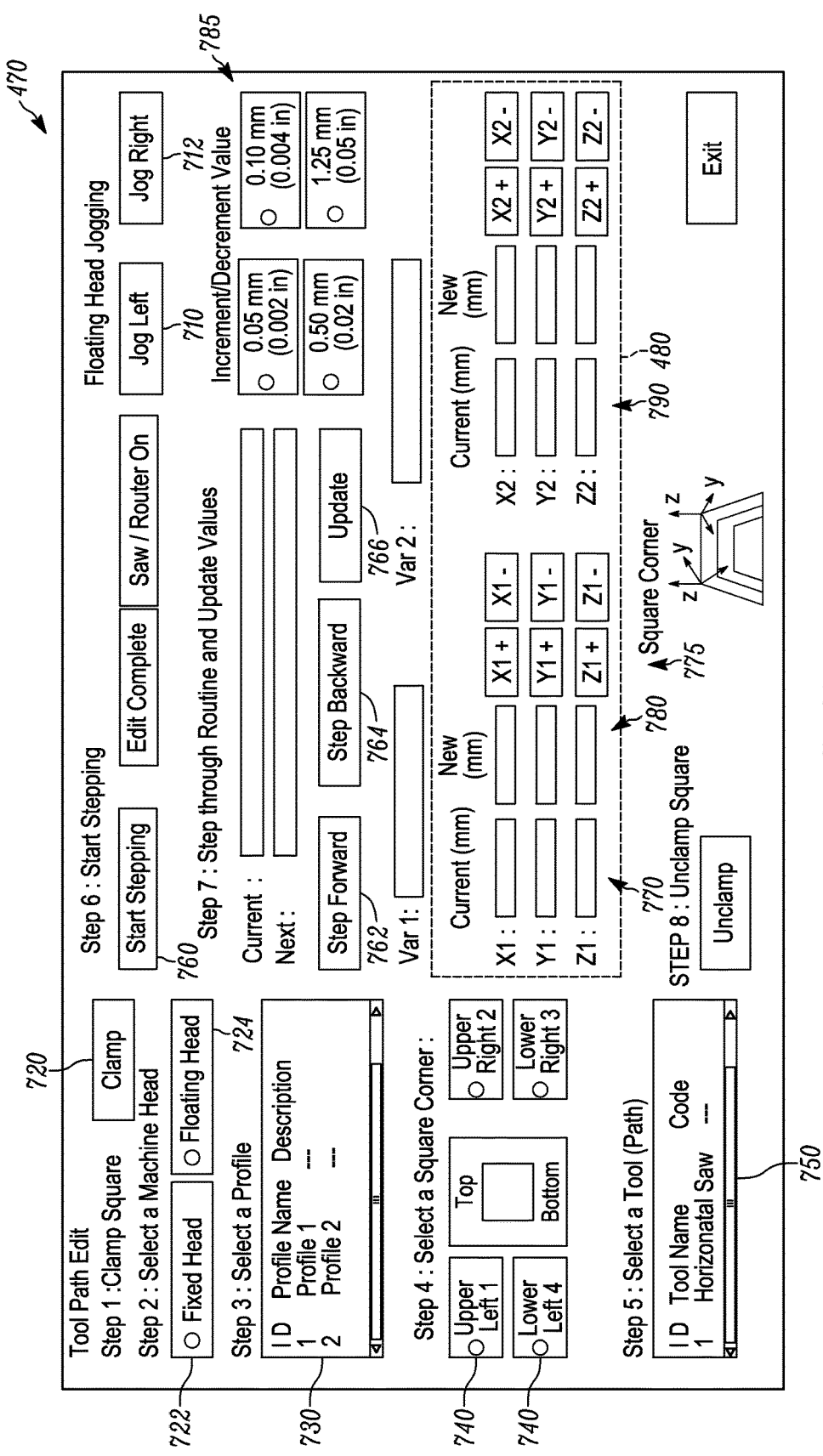
FIG. 48 illustrates one example of a graphical user interface to enable editing of a profile tool path without knowledge of the raw program.

FIG. 48 depicts a tool path edit screen 470, which allows a user to move a particular tool through a series of steps in a cleaning routine for cleaning a corner of a window frame element 100, such as the frame depicted in FIGS. 36 and 37. The screen 470 allows the user to manipulate a mouse or touch screen interface to the computing device 704, which outputs the depiction on the screen and allows the operator to choose a particular raw program file that controls movements (MOVEJ, MOVEL, or MOVEC) of a robot cleaning tool. During production these sequence of steps are performed one after another as the robot executes the raw code. The tool path edit screen 470 and user interface of the exemplary embodiment allows for a more controlled stepping through the various paths that make up a cleaning sequence and more particularly, each time a step forward control 762 is actuated by the operator or user.

Figure 43:
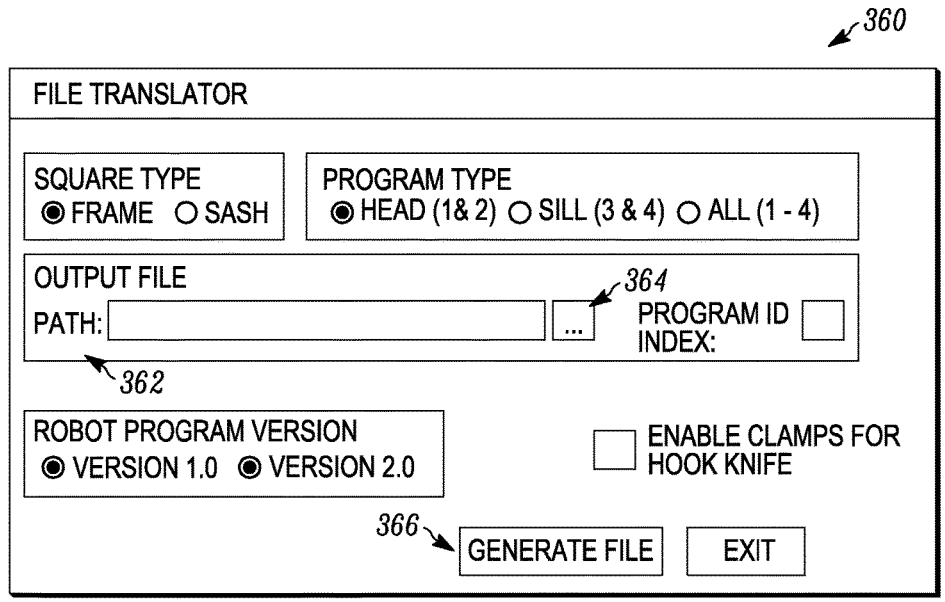
FIG. 43 illustrates an example of a graphical user interface to launch a file translation system application as described herein.
Figure 44:
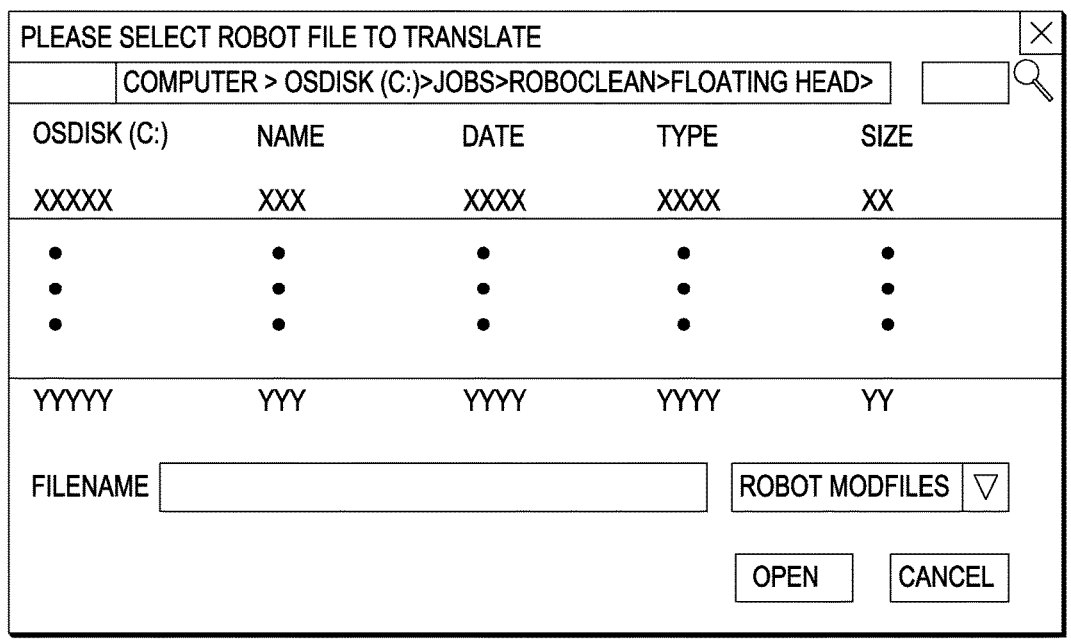
FIG. 44 illustrates an example of a graphical user interface of a selection utility that can be used to select a raw file for further processing by the file translation system.

The file translation software component or more simply translator 705 (FIG. 42) begins with the step of launching a screen 360 (FIG. 43) in a graphical user interface (GUI) on the computing device 704 with input fields that enable a user to select an output path 362 where the translated file will be saved. A file index 364 is used to name the files in the translated format. As an example, PROFILE_xx_Corner_y.MOD would designated such a file. In this example, PROFILE identifies the window or door profile from one of a number of such profiles, xx is the number specified in the file index text box (e.g., numbered from 1 to 99) and y is the window corner number, which is automatically assigned by the translator. A Generate File 366 button control, when selected, allows the user to select a raw file (CNC machine code) to be translated. Multiple such files are shown in the selection utility 368 of FIG. 44. Raw files listed in the FIG. 44 depiction that have been revised by the translator program have a .MOD extension. The screen 360 allows the user to switch back and forth between a frame and a sash selection and based on that choice select the number of corner files to generate. A check box styled "Enable Clamps for Hook Knife" when checked, enables lower clamps for the hook knife routines only. This only applies to HOOK_KNIFE move commands as designated in the raw robot program.

Each head of the articulating arm can have its own set of raw programs (e.g., where the robot includes both a Fixed Head and a Floating Head, each head can be controlled by one or more raw programs). Once a file is selected using the selection utility, a translated program is computed for each corner and stored in the selected output file path as a translated program. These translated programs can then be downloaded into the controller 35 via a robotic programming utility provided by ABB as part of its RobotStudio software development kit.

Each raw software module is identified by the robot head (fixed or floating) being used and the tool being used. In reading 402 (FIG. 45) the raw program the translator selects 404 a robot type. Two example robot types are the fixed head, designated in 406 as robot program 1, and the floating head, designated in 408 as robot program 2. In step 410, the tool type is selected from a group 412, which can include, e.g., a saw 302 of FIG. 12, a router 304 of FIG. 29, and a knife 306 of FIG. 30.

Figure 45:
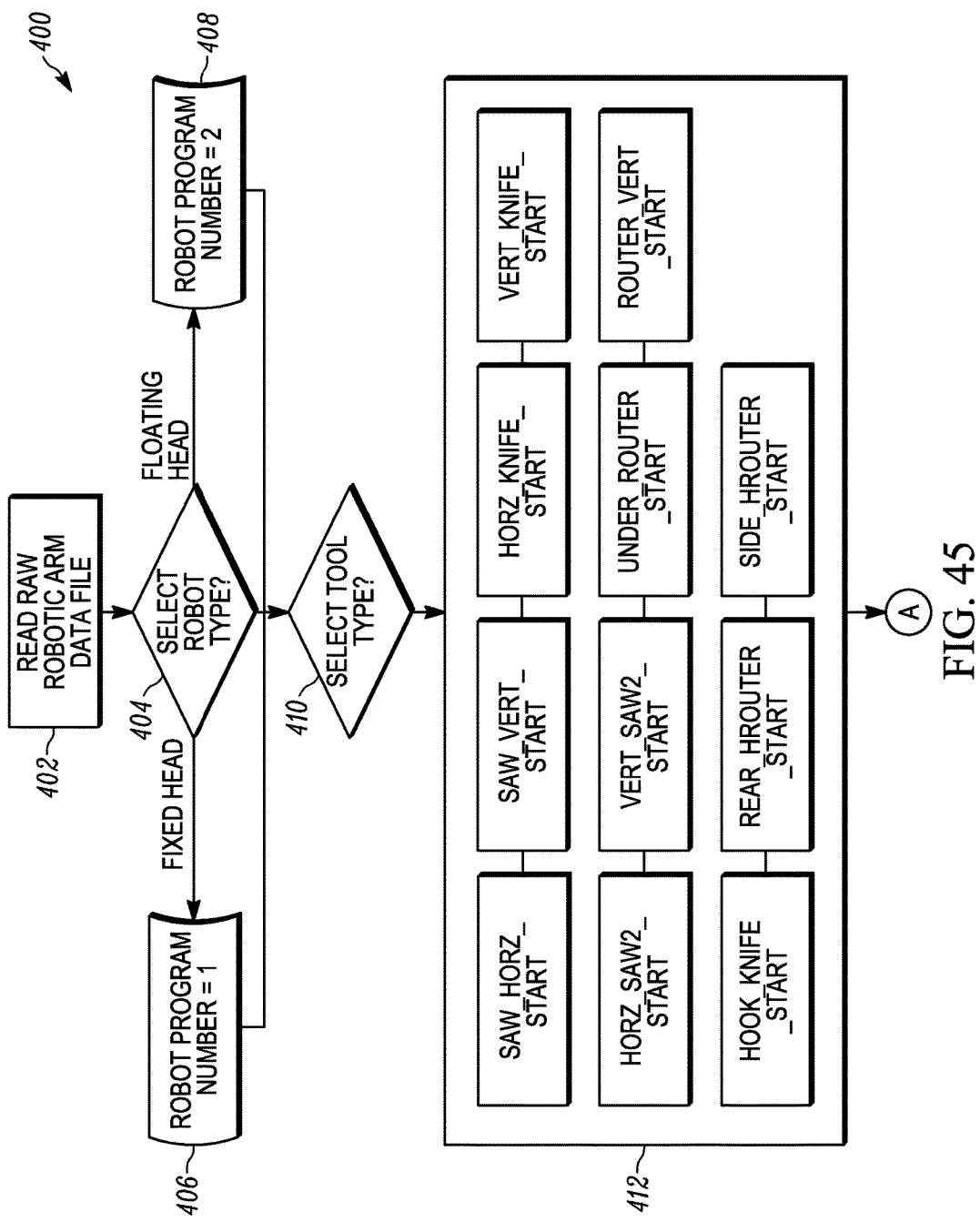
FIGS. 45-46 illustrate example methods of implementing the file translation system.
Figure 46:
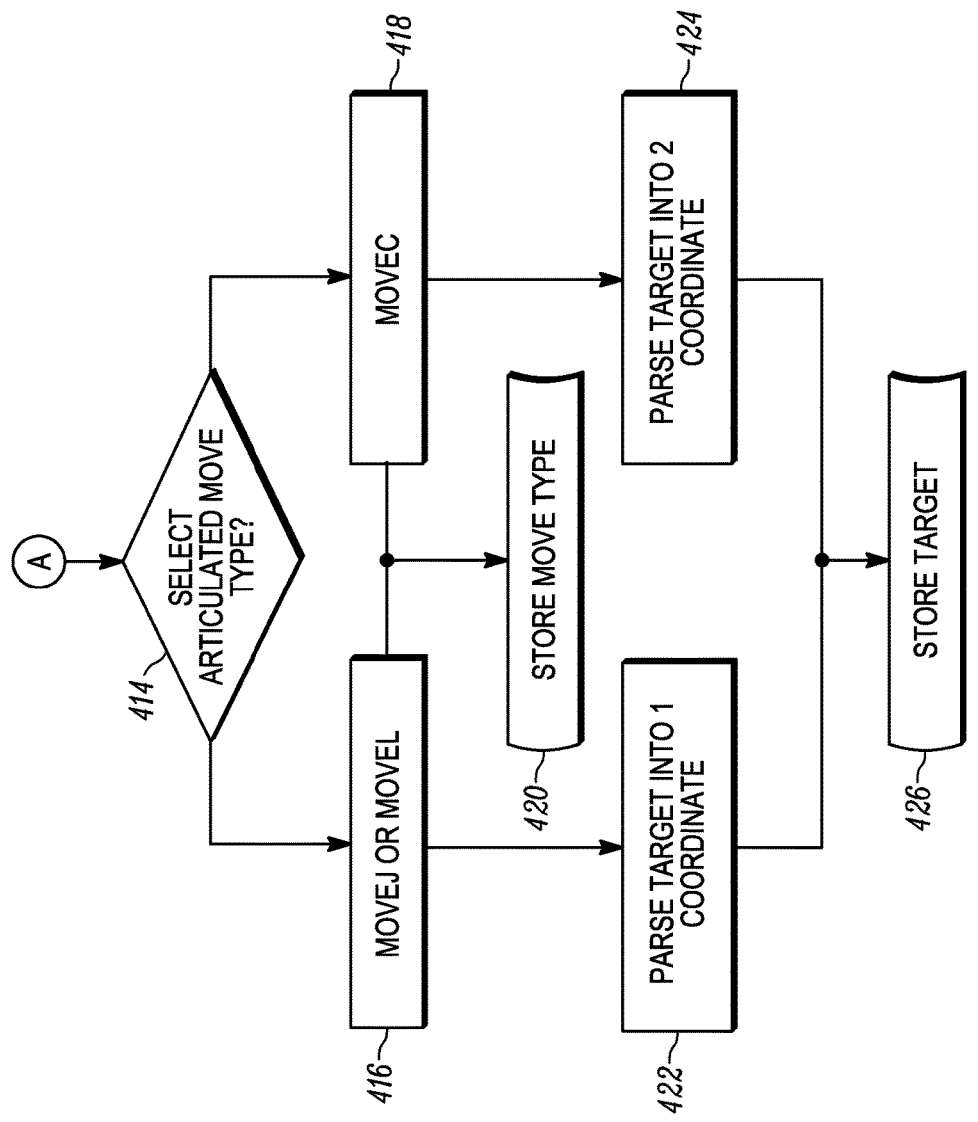

As shown in FIG. 45, the human machine interface 706 allows the user to select the tool type from at least the following list: a horizontal saw (SAW_HORZ_START); a vertical saw (SAW_VERT_START); a horizontal knife (HORZ_KNIFE_START); a vertical knife (VERT_KNIFE_START); a vertical router (ROUTER_VERT_START); a horizontal rear router (REAR_HROUTER_START); a horizontal side router (SIDE_HROUTER_START); a horizontal 45 router (ROUTER_HORZ_45_START) an under router (ROUTER_UNDER_START); a hook knife (HOOK_KNIFE_START); and a series of miscellaneous tool types (FAB1_START; FAB2_START; FAB3_START; FAB4_START; FAB5_START), Once the output file designation is determined and tool type selected, the translator progresses by point "A" to the steps depicted in FIG. 46 to identify or select 414 an articulated move type within the code for manipulating that tool as either MOVEJ/MOVEL at 416, or MOVEC at 418. Details of these three types of tool movement and their arguments are documented in the ROBOTSTUDIO software development kit (SDK) available from ABB. The programming manual of this software development kit is incorporated herein by reference.

The move types that make up a given tool path (including the path segment TP of FIGS. 36 and 37) are preprogrammed (with the pendant) and modified to control the movement of the articulating arm. MOVEJ describes a controlled movement from a three dimensional location with a first set of coordinates (e.g., $x_1$, $y_1$, $z_1$) to a second set of coordinates (e.g., $x_2$, $y_2$, $z_1$), where two of the three dimensions have been altered. MOVEL can provide movement from a first coordinate to a second coordinate where a single dimension has been changed (e.g., from $x_1$, $y_1$, $z_1$ to $x_2$; $y_1$, $z_1$). MOVEC provides for a circular movement, such as an are along a radius through an angle (e.g., from a first point $x_1$, $y_1$, $z_1$ to a second point $x_2$, $y_2$, $z_2$ along a circular path having a radius that extends from a third center of the circular arc point $x_3$, $y_3$, $z_3$).

The file translator 705 evaluates code and stores in memory 420 an array of move types (MoveL etc.) contained in the raw robot program created using the programming pendant for example. In steps 422 and 424, the translator parses out into separate lines of code the arguments, including the spatial coordinates associated with that move type. Key words are parsed by the translator by identifying the different move types (e.g., MOVEJ, MOVEL, and MOVEC). When so identified, the translator re-writes associated move type data to an intermediate file 426 in memory. In other words, the file translator system takes the move types and coordinates from each line of native code and breaks the commands and coordinates apart. Parsing the raw code in this manner ensures that the program integrity is maintained, as well as enabling the user to edit the program information via the human machine interface 706 and allows the controller 35 to back the tool along its initial path in the event of a fault.

Having read and parsed the raw data file of the original raw program into two data stores 420, 426, the translator 705 writes the data out to a disk file in a suitable format, that can be interpreted by the HMI software as well as the robot controller 35. For the HMI software this means embedding line numbers in subroutine calls that access the data of the move commands and for the robot controller 35 this means preserving the data arguments of the initial move commands (with the possible small changes introduced by operator via the HMI that is discussed below).

Figure 47:
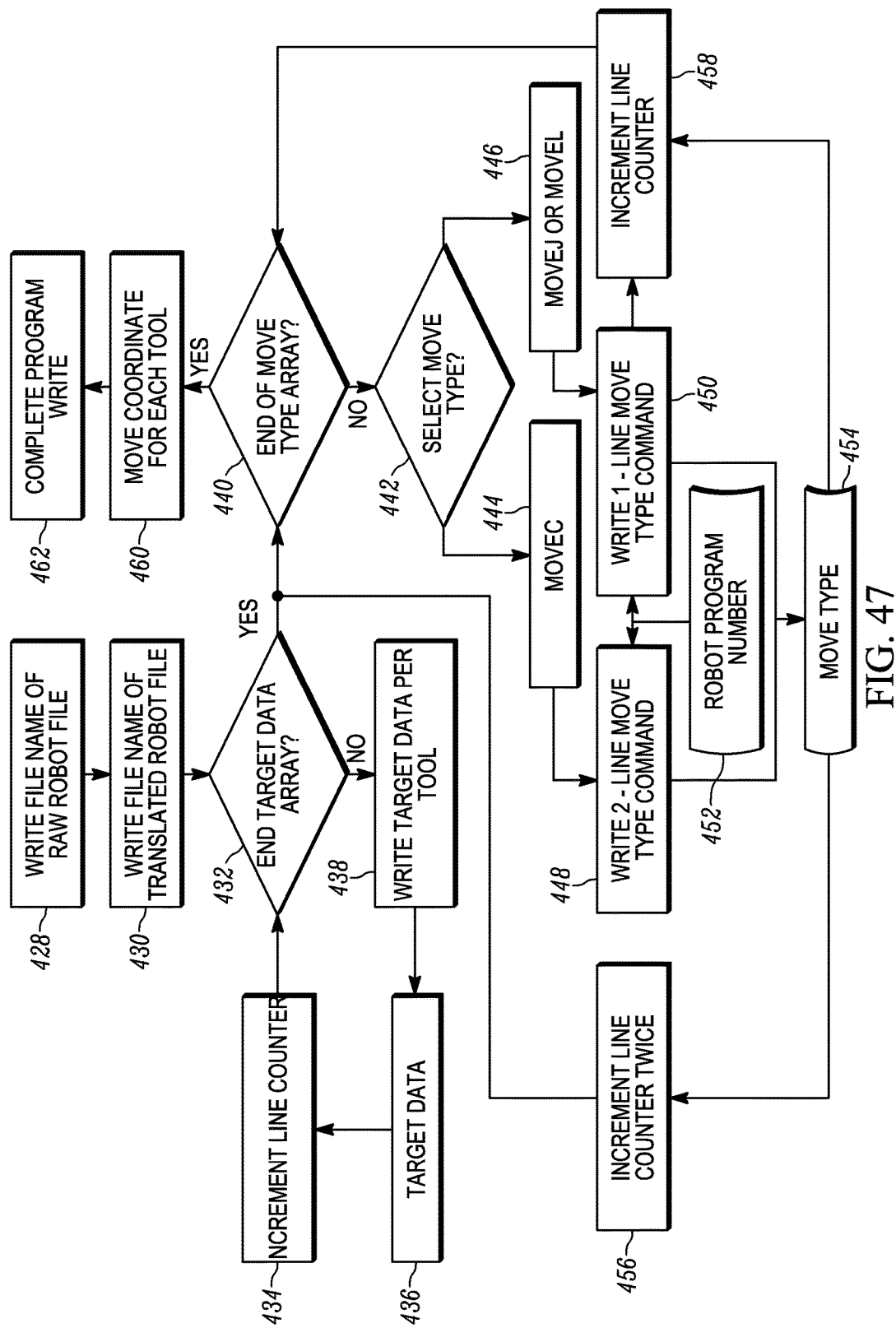
FIG. 47 illustrates one example method of writing the translated data.

The process of writing this data to disk is summarized by the series of steps depicted in FIG. 47. First, the raw control file name is written 428 and the translated control file name is written 430 into a file header. As an example, a file header can contain an original raw data file name in the format !Source File: <original file name here>, as well as a translated file name in the format MODULE PROFILE_xx_Corner_y.MOD, where xx is the number specified in the File Index text box (from 1 to 99), and y is the corner number (that is assigned by the translator automatically).

After writing the file header, a target program that stores move types is created until complete 432. Initially, the translator 705 checks 432 to see if there are any target data to create. Assuming there is target data to create from the data store 426 of FIG. 46, native code for each move command from the store 426 is written 438 into the target data 436. Each line of this target data is assigned a line number that is incremented by one until all target data from the store 426 has been assigned line numbers and stored in the data store 436.

Once all target data has been determined to have been assigned line numbers, at decision step 432, a move type array in the store 420 is evaluated. The translator cheeks 440 to see if there are any entries in the move type array in the store 420. Each move of the move type array is then selected 442 as either MOVEJ/MOVEL 444 or MOVEC 446. The move type command for each tool is also written in 448, 450, and assigned a robotic program number 452. For each move type 454, the line counter is incremented at a first 458 and a second 456 line before checking the move type array at 440 to see if the move type array is complete. In so doing, each tool type is written out, grouped together, and sequentially numbered to snatch the coordinates. Once all the move types are stored, at step 460, the move coordinates for each tool type are written out, grouped together, and sequentially numbered in the order of the initial raw program from which they are referenced, thus completing the translated program write at 462. Once completed, the translated file program is suitable for profile path editing and recovery, as described below.

Example Listings

Here are two examples of a native MoveJ and MoveL commands that were initially programmed with the pendant to implement the tool movement TP shown in FIG. 36 or 37. The MoveJ command immediately precedes the MoveL command:

Listing 1:

!Rob1_Saw_Horz_Start; (Comment line)

MoveJ[[−100,0,200],[0.381007,−0.00189581,0.924556,−0.0517665],[−1,−1,0,0],[9E+09,9E+09,9E+09E+09,9E+09, 9E+09]], v2500,z,50, Saw_Rob1\WObj:=Wobj_R1_45;

MoveL[[86,0,200],[0.380959,−0.00189673,0.924575,−0.00520624],[0,−1,0,0],[9E+09E+09,9E+09,9E+09,9E+ 09]], v2500,z0,Saw_Rob1\WObj:=Wobj_R1_45;

The translator first identifies this section of native code by evaluating the comment lines in the code. This code section has a comment beginning with the character (!) and indicates this is code for the horizontal saw on Robot 1. This comment line is added during assembly of the Robot by someone familiar with use of the programming pendant and allows the translator to determine the tool and robot that this code controls. The translator 705 evaluates these two statements by parsing these commands and adding line numbers. The three numbers [−100, 0, 200] are the end coordinates for the saw 304 after the MoveJ command is executed. After the MoveL command is executed, the end coordinates are [86, 0, 200] meaning the saw moved 186 units of measure (in this instance mm) in a straight line path TP along the x direction. The translator evaluates this code and produces two sections of translated code:

Listing 2:

LOCAL PERS robtargetpHORZ_SAW1:=[[−100,0,200], [0.381007,−0.00189581,0.924556,−0.00517665],[−1,−1,0, 200],[9E+09,9E+09,9E+09,9E+09,9E+09,9E+09]];

LOCAL PERS robtarget pHORZ_SAW2:=[[86,0,200], [0.380959,−0.00189673,0.924575,−0.00520624], [0,−1,0, 0], [9E+09,9E+09,9E+09,9E+09,9E+09,9E+09]];

LOCAL PROC rHORZ_SAW( )

MoveJ pHORZ_SAW1,v2500,z50,Saw_Rob1\WObj:= Wobj_R1_45;

MoveL pHORZ_SAW2,v2500,z0,Saw_Rob1\WObj:= Wobj_R1_45;

ENDPROC

The exemplary system has multiple interacting software components including the controller software that controls the controller 35 of the robot. The exemplary file translator 705 is implemented in Visual Basic. The exemplary HMI 706 is written in C# (Csharp) and is capable of calling the local procedure LOCAL PROC rHORZ_SAW( ) from within the C# program. For the translated code, the MoveL command is contained within the Local Procedure "rHORZ_SAW( )". This MoveL command is identified with a line number that was added by the translator 705, namely "pHORZ_SAW2". When the controller 35 evaluates this procedure, it matches the line number from the local procedure call which acts a a pointer into the data stored in the local persistent array (LOCAL PERS) allowing the controller to access the data in that array.

An example of a MoveC is the following:

listing 3:

!Rob1_Rear_HRouter_Start; (comment)

MoveL [[13.5,64.55,22.98],[0.644654,−0.655546,− 0.271077,0.284954],[0,1,1,0], [9E+09,9E+09,9E+09,9E+ 09,9E+09,9E+09]],v50,z0, Router_Horz_Rear_Rob1\WObj:=Wobj_R1_Rout_90;

MoveC [[13.5,68.5,18.36],[0.644631,−0.655557,− 0.271089,0.28497],[0,1,1,0],[9E+09,9E+09,9E+09,9E+09, 9E+09,9E+09]], [[13.5,64.55,13.74],[0.644618,− 0.655567,−0.27109,0.284973],[0,1,1,0],[9E+09,9E+09,9E+ 09,9E+09,9E+09,9E+09]], v5, z0, Router_Horz_Rear_Rob1\WOBJ:=Wobj_R1_Rout_90;

And here's how the MoveL and the MoveC gets parsed out and the lines numbered as it's translated:

Listing 4:

LOCAL PERS robtarget pREAR_HROUTER1:=[[13.5, 64.55,22.98],[0.644654,−0.655546,−0.271077,0.284954], [0,1,1,0], [9E+09,9E+09,9E+09,9E+09,9E+09,9E+09,]];

LOCAL PERS robtarget pREAR_HROUTER2:=[[13.5, 68.5,18.36],[0.644631,−0.65557,−0.271089,0.28497],[0,1, 1,0],[9E+09,9E+09,9E+09,9E+09,9E+09,9E+09]];

LOCAL PERS robtarget pREAR_HROUTER3:=[[13.5, 64.55,13.74],[0.644618,−0.655567,−0.27109,0.284973],[0, 1,1,0],[9E+09,9E+09,9E+09,9E+09,9E+09,9E+09]];

LOCAL PROC rRear_HROUTER( )

MoveL pREAR_HROUTER1,v50,z0, Router_Horz_Rear_Rob1\WOBJ:=Wobj_R1$_{13}$ Rout_90;

MoveC pREAR_HROUTER2,pREAR_HROUTER3,v5, z0, Router_Horz_Rear_Rob1\WOBJ:= Wobj_R1_Rout_90;

ENDPROC

The first line encountered by the translator 705 is a MoveL command having ending coordinates [13.5, 64.55, 22.98]. The MoveC command that follows the MoveL command has two sets of coordinates [13.5, 68.5, 18.36] and [13.5, 64.55, 13.74] as arguments, where the first set corresponds to the end point of the arcuate tool movement and the second coordinate is the center point for the arcuate movement. The translated code has a MoveC command within the local procedure and associated with that MoveC command are two line numbers "pREAR_HROUTER2" and "pREAR_HROUTER3", which allows the procedure to access the coordinate data for this MoveC command. This use of two line numbers is why, at step 456 FIG. 47 the translator skips two line numbers (rather than one) when a MoveC command is evaluated.

The translated code simplifies a process of editing a programmed profile for movement of an articulating arm. The method enables an operator to add or subtract a selected distance to an X, Y or Z coordinate, the simplicity of which provides advantages over conventional methods that employ the control pendant requiring extensive training and experience in order to modify a cleaning path followed by a tool mounted to the articulating arm.

Profile tool path editing is integrated into the HMI application on the articulating arm. The main screen 470 illustrated in FIG. 48 provides a step-by-step utility configuration to guide the user through the editing process. For example, the editing can change the tool path shown in FIGS. 36-37 to a new tool path so long as the changes or adjustments fall below a specified threshold.

To modify a tool path, the user mounts a frame in place in relation to a fixed and floating head having tools for cleaning the frame. The fixed head stays in place for all frames and the floating head can be moved or jogged along a linear track using two controls 710, 712 based on the size of the frame to be cleaned. The screen 470 has a control 720 to clamp the frame in place and two controls 722, 724 for selecting whether the fixed or floating head is chosen for stepping movement through a sequence of cleaning steps which in combination make up one cleaning path. These two controls 722, 724 are mutually exclusive so that for example if the fixed head is chosen the interface deselects the floating head. Other controls 730, 740, 750 allow the user to select a particular window frame profile, a particular corner of the frame 100 and a particular tool such as the saw 304. The specific combination of frame profile, corner and tool determines a particular program to be executed by the controller 35 during cleaning.

The screen 470 has a control 760, which when selected, starts the process of stepping through a sequence of consecutive paths or tool movement segments to accomplish cleaning of a frame that has been clamped in relation to the robot. Specific controls 762, 764, 766 depicted in FIG. 48 control this stepping function. Under normal production operating conditions the move commands in the local procedure PROC rHORZ_SAW are executed from start to finish. However, when the HMI software is performing the tool path edit function, this software accesses the ABB RobotStudio SDK function call that causes the controller 35 to execute a single move command at a time in stepping mode. The translated native code is executed one step or segment at a time through use of the control 762. This is made possible due to operation of the translated native code as explained below.

Assume the saw 302 traverses the path TP in FIGS. 36 and 37 as one step in a sequence of steps. Actuation of the control 762 by a user causes the saw 302 depicted in FIGS. 36 and 37 to step sequentially through the cleaning sequence until the controller reaches the stage of the native code that causes the saw 302 to transverse the path TP shown in FIGS. 36 and 37. This path TP is implemented by causing the saw to traverse a path where the robot arm moves with a constant or fixed z co-ordinate, fixed or constant y co-ordinate, and a changing x co-ordinate in an orthogonal co-ordinate system defined in FIG. 37. This move can be accomplished with a MOVEL command such as the MoveL command of listing 1 above. The specifies arguments of this command, including the ending coordinate are originally derived from control over the programming pendant, but as explained below can be modified in a limited way using the translated native code achieved through practice of the exemplary embodiment.

Figure 49:
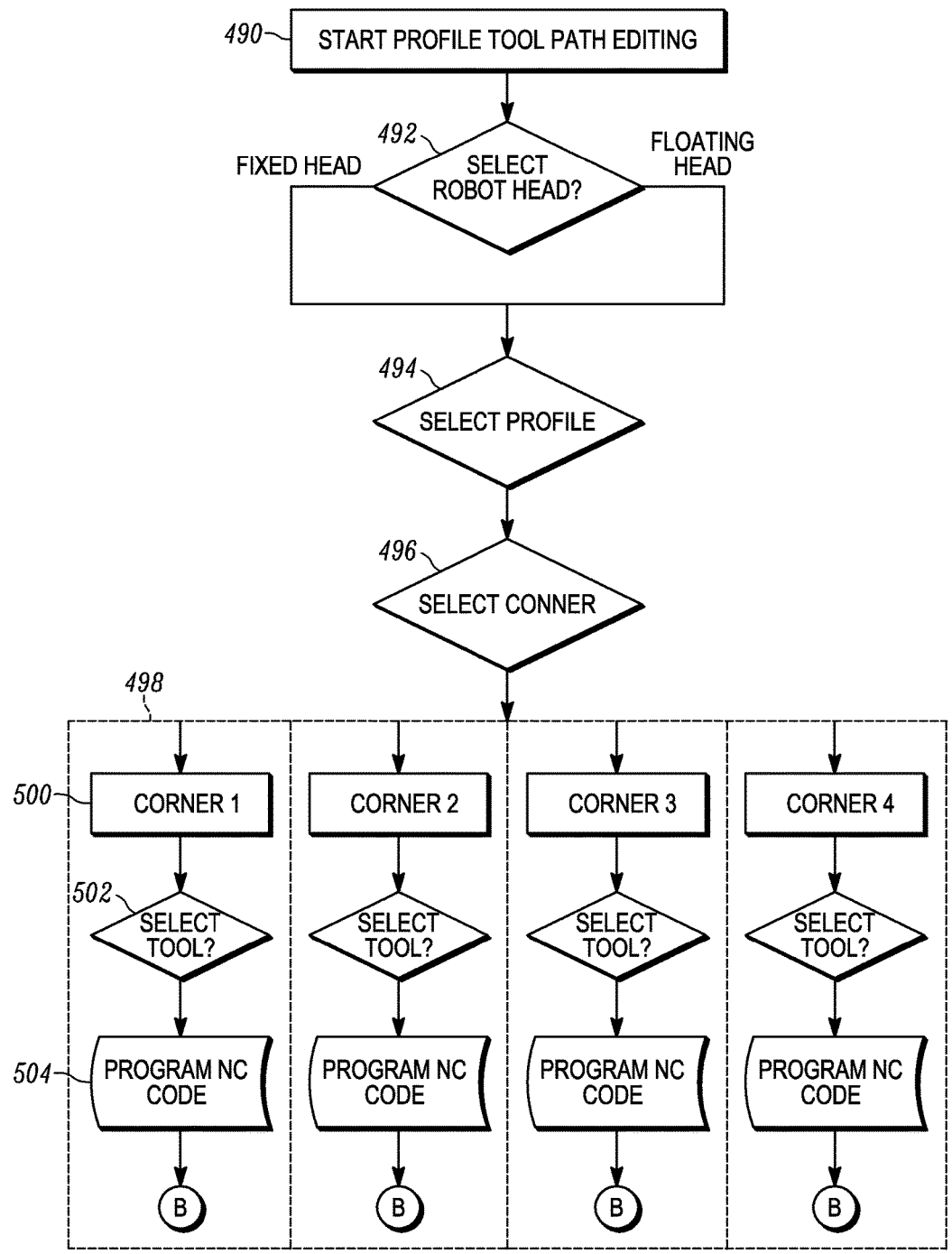
FIGS. 49-50 illustrate an example method of editing a profile tool path.
Figure 50:
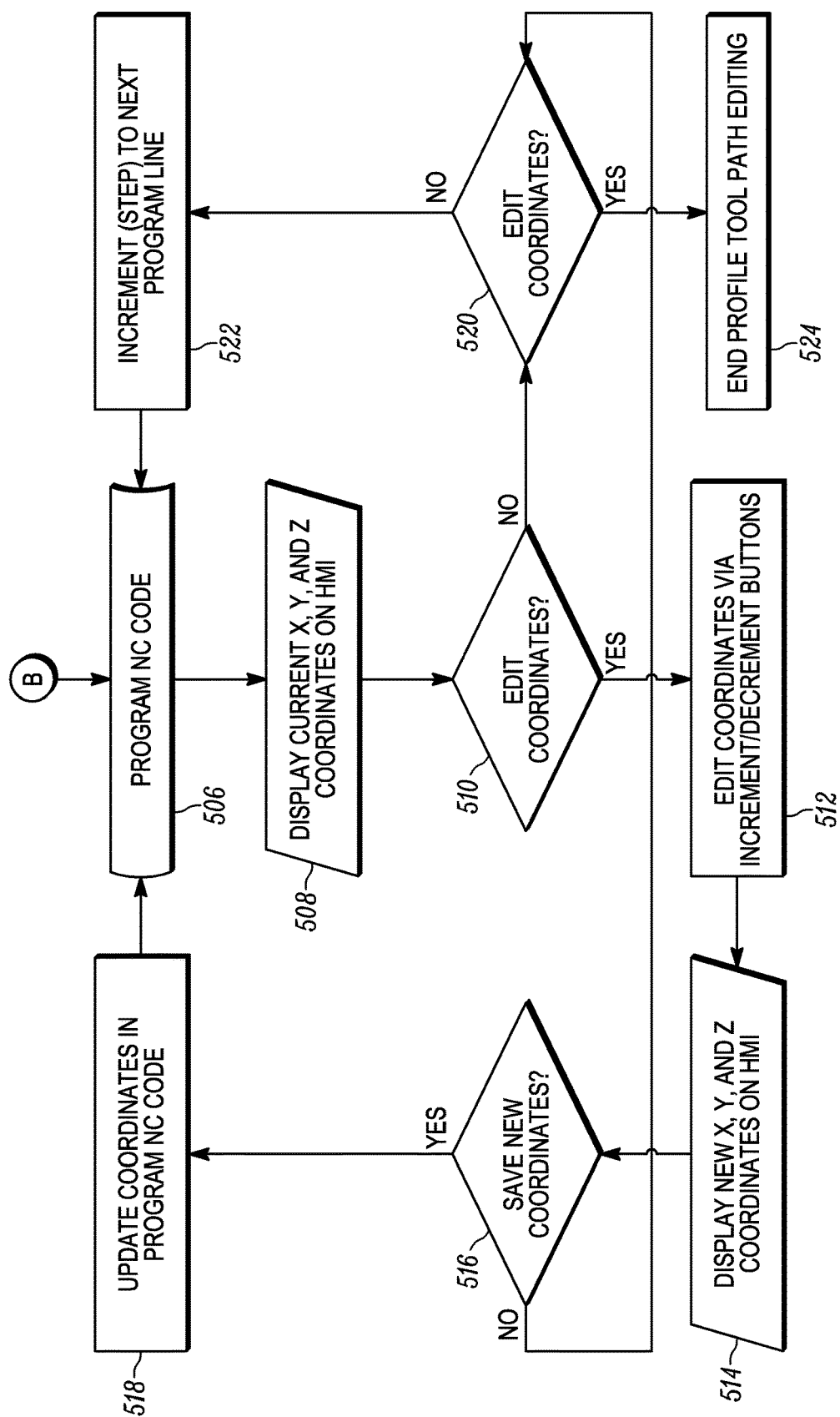

FIGS. 49 and 50 illustrate a process of editing a profile tool path. The profile tool path editing begins at 490, continuing by selection of the robot head 492 as either fixed or floating by means of the controls 722, 724. A profile is then selected in 494 with the control 730, followed by selection of a particular corner 496 using the control 740. The editing process is configured to edit more than one corner at a time, as demonstrated in area 498. In the example of FIG. 49, Corner 1 has been selected, although Corners 2-4 could similarly or additionally be edited by the steps described herein.

Having selected Corner 1 at 500, a particular tool is selected 502 using the control 750 and the program code is edited 504. Following point "B" to FIG. 50, the program code 506 enables the display 508 of the current X, Y, and Z coordinates on the HMI, more particularly text boxes 770. At 510, it is determined whether the coordinates require editing. If the coordinates require editing, the coordinates are edited 512 via the increment/decrement buttons 775, e.g., as depicted in FIG. 48. Once edited, the new coordinates are displayed 514 on the HMI in text boxes 780 and sent to the file to be saved 516, if so desired. If saved, the coordinates are updated 518 in the native CNC program. If the updated coordinates are not to be saved, the editing process is continued at 520. If the editing process is not complete, the program line is incremented 522 and returned to die program code 506, where the process is repeated until no more edits are needed. If the editing process is complete, the profile tool path editing tool is terminated at 524.

Example Tool Path Editing.

The XYZ coordinates are stored in the first set of coordinates in the persistent data array;

LOCAL PERS robtarget p_HORZ_SAW1:=[[−100,0, 200],[0.381007,−0.00189581,0.924556,−0.00517665], [−1,−1,0,0],[9E+09,9E+09,9E+09,9E+09,9E+09,9E+09]];

So −100 mm is the X coordinate, 0 mm is the Y co-ordinate, and 200 mm is the Z coordinate. These are the coordinates displayed in the text boxes 770 of FIG. 48. For MoveL and MoveJ these are the X1, Y1, and Z1 fields and the particular set of coordinates for this example correspond to the end coordinates for the MoveJ command of listing 1. On a Move C there are 6 coordinates because of the two lines required for each move (X1, Y1, Z1, X2, Y2, Z2) and therefore the text boxes 770, 790 are both populated.

Assume the user would like to change the Y coordinate of the beginning of the move path TP of FIGS. 36 and 37 by 0.10 mm. The user would active an appropriate Increment/Decrement value from the selection control 785 and toggle or press the Y1+ button on the screen. This action would result in a change to the line of code as follows:

LOCAL PERS robtarget pHORZ_SAW1:=[[−100,0.10, 200],[0.381007,−0.00189581,0.924556,−0.00517665],[− 1,−1,0,0], [9E+09,9E+09,9E+09,9E+09,9E+09,9E+09]];

This change is implemented by the HMI interface directly without resort to the pendant and is made possible by addition of the line numbers in both the procedure call and local persistent data array in which the changed data is stored.

Tool Path Recovery

Figure 51:
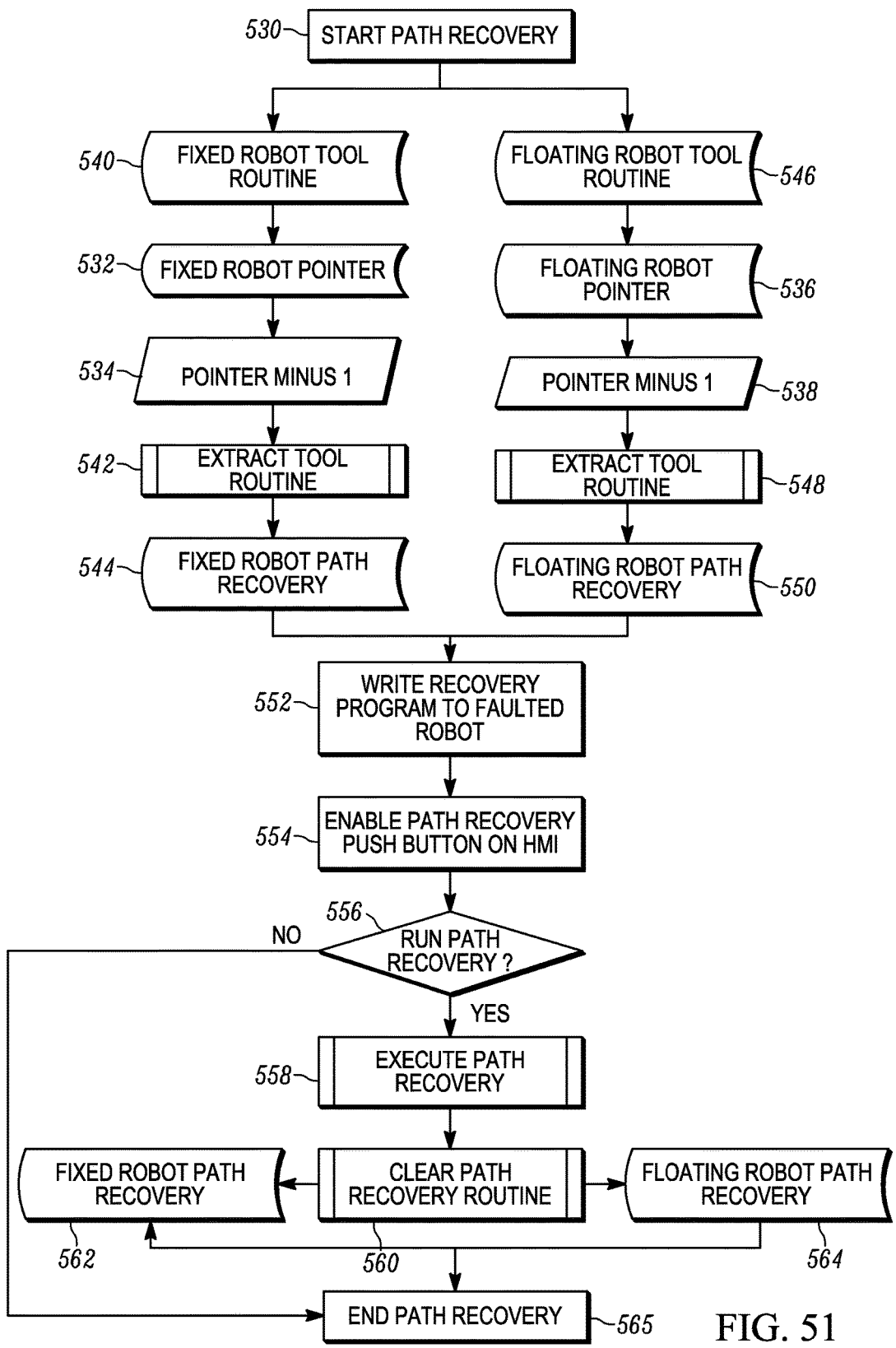
FIG. 51 illustrates one example method of a tool path recovery function.

The tool path recovery function, as illustrated in FIG. 51, is a method that creates a live record, or path, of where the robot is in space as well as the sequence of steps that were executed while executing a cleaning program. The stored information of previously executed movements and specific placement in a given sequence enables the operator or the machine to recover from an interruption during the cleaning program. For example, when an emergency stop is initiated, the sequence of the then current cleaning program is interrupted and the articulating arm may be moved away from the work surface. By storing information relating to the moves and specific placement of the articulating arm at the point of the interruption, the cleaning program can be safely restarted, manually or automatically, with or without the intervention of the operator.

A shut down or emergency stop condition is created when the articulating arm is found to be in a positioning error state during execution of a window cleaning program. For example, an excessive amount of PVC material at a window frame or sash joint may create an amount of resistance to the operation of the articulating arm that exceeds a threshold amount. Further, the cleaning program may be running a cleaning program that is not appropriate for a particular application, and the program can interrupt the operation upon recognition of the error. An emergency stop condition can also arise during a power fault or true emergency state, where the interruption can be initiated by the user to force an immediate shut down of the machine. Additionally, an emergency stop condition can also be induced when the operator steps into or interrupts a safety light curtain across the front of the machine. This light curtain would be implemented with one or more of the sensors S of FIG. 1. Additional fault inputs could be implemented via one of the user inputs 707 of the HMI or a separate emergency stop switch 709.

In the event that an articulating arm experiences a fault or an emergency stop is initiated, the tool path recover program begins at 530 (FIG. 51) by reading and recording the current tool and line number pointer from each robot from the translated file previously created (FIG. 47). As an example, the start path recovery 530 is directed to the fixed robot tool routine 540 as well as the floating robot tool routine 546. The routines 540 and 546 can correspond to settings provided for controlling the movement of the articulating arm such as by the programming pendant. Once the routines 540 and 546 have been accessed fixed robot 532 and floating robot 536 line pointers are noted and stored. At steps 534, 538 the program then subtracts one from the line item pointer for each articulating arm. In the example of FIG. 50, the line pointers 532 and 536 identify a line of the program code corresponding to the movement that occurred immediately prior to the stoppage. From the line number pointer immediately prior to the stoppage, the program reads and records each line number pointer incrementally from a position in the code that corresponds to the position of the articulating arm immediately prior to the stoppage to the initial position of the articulating arm for the current movement. Thus, the program reads each line in the current tool's cleaning program, according to the routine of 540, 546, from the current line number pointer and corresponding position back to and including the first line representing, e.g., a starting position, by use of extract tool routine 542, 548. The result is a robot path recovery for each robotic head 544, 550 defined by each line number pointer associated with the already executed tool path.

The program writes 552 an associated recovery program to each robot and provides a path recovery button 554 on the HMI. If the user engages the path recovery button 556, the cleaning program executes 558 the written recovery routine for each articulating arm. Once the routine for each articulating arm is complete, the written recovery routine can be cleared 560 from each associated program 562, 564 ending the path recovery process 566. Clearing the program may be done for safety purposes, such that the path recovery program cannot be run again.

Assume that in the program of listing 1 above, an emergency fault occurs as the robot manipulating the saw is in the middle of the nest move command. The HMI software must create a recovery plan or path that causes the robot to retrace its movements up to the time of the fault. The current move command is known, the starting point for that move command is know from the end point of the MoveL command in listing 1, i.e. [86, 0, 200] so the software creates a reverse movement from the then current command and its end point as defined by the previous command. This is done sequentially from the point of disruption to the start point by reference to the end point coordinates of each command.

Example Computing Device

Figure 52:
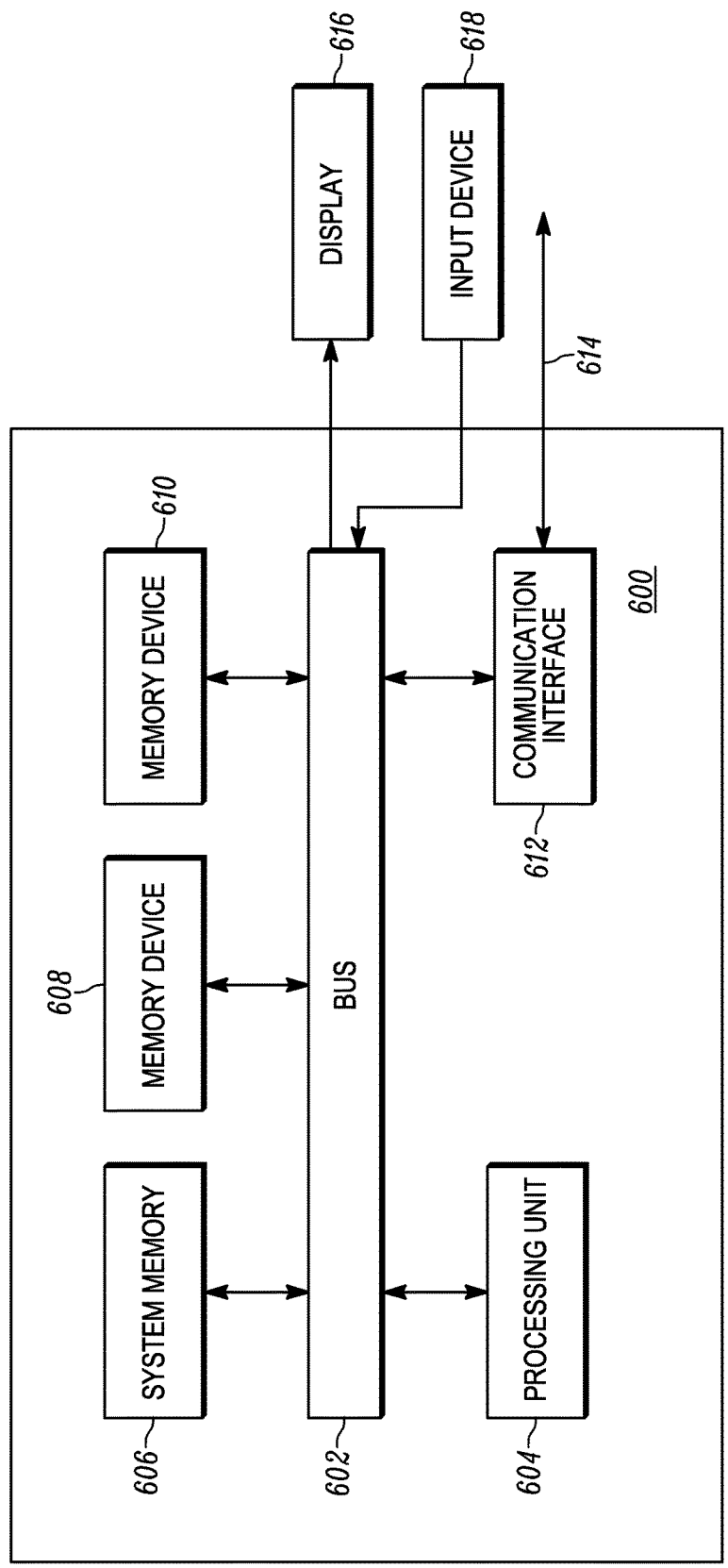
FIG. 52 is a schematic block diagram illustrating an exemplary system of hardware components capable of implementing examples of the systems and methods disclosed in FIGS. 42-51.

FIG. 52 is a schematic block diagram illustrating an exemplary system 600 of hardware components capable of implementing examples of the robotic file translator system illustrated in FIGS. 42-51. The system 600 includes various systems and subsystems. The system 600 can be for example, a personal computer, a laptop computer, a tablet computers a smart portable device, a workstation, a computer system, an appliance, an application-specific integrated circuit (ASIC), a server, a server blade center, a server farm, or a similar device.

The system 600 includes a system bus 602, a processing with 604, a system memory 606, memory devices 608 and 610, a communication interface 612 (e.g., a network interface), a communication link 614, a display 616 (e.g., a video screen), and m input device 618 (e.g., a keyboard and/or a mouse). Processing unit 604 can be implemented as, e.g., controller 35 as depicted in FIG. 1. The system bus 602 is in communication with the processing unit 604 and the system memory 606. The additional memory devices 608 and 610, such as a hard disk drive, server, stand alone database, or other non-volatile memory, are in communication with the system bus 602. The system bus 602 interconnects the processing unit 604, the memory devices 606-610, the communication interface 612, the display 616, and the input device 618. In some examples, the system, bus 602 also interconnects an additional port (not shown), such as a universal serial bus (USB) port. The processing unit 604 can be a computing device and can include an application-specific integrated circuit (ASIC). The processing unit 604 executes a set of instructions to implement the operations of examples disclosed herein. The processing unit 604 can include a processing core.

The additional memory devices 606, 608 and 610 stores data, programs, instructions, database queries in text or compiled form, and any other information that can be needed to operate a computer. The memories 606, 608 and 610 can be implemented as non-transitory computer-readable media (integrated or removable) such as a memory card, disk drive, compact disk (CD), or server accessible over a network. In certain examples, the memories 606, 603 and 610 store text, images, video, and/or audio, along with appropriate instructions to make the stored data available at an associated display 616 in a human comprehensible form. Additionally, the memory devices 603 and 610 can serve as databases or data storage for the file translator system illustrated in FIGS. 42-51. Additionally or alternatively, the system 600 can access an external data source through the communication interface 612, which communicates with the system bus 602 and the communication link 614.

In operation, the system 600 is used to implement a control for a file translator system such as described herein.

Computer executable logic for implementing the file translator system resides on one or more of the system memory 606 and the memory devices 603, 610 in accordance with certain examples. The processing unit 604 executes one or more computer executable instructions originating from the system memory 606 and the memory devices 603 and 610. The term "compute readable medium" as used herein refers to a medium that participates in providing instructions to the processing unit 604 for execution, and can include multiple physical memory components linked to the processor via appropriate data connections.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A method for removing material from regions of a window or door frame comprising:
   defining a sequence of movements for an abrading tool which bring said abrading tool into contact with one or more regions of a window or door frame and converting said sequence of movements into an initial control program for a robot controller coupled to a robot having an articulating arm for moving said abrading tool along an initial tool path;
   parsing the initial control program to identify a sequence of move commands and associated spatial coordinate data that define travel limits of said sequence of move commands;
   assigning an identifier to each move command and the associated spatial coordinate data for the respective each move command in the sequence of move commands to enable each move command to access its associated spatial coordinate data;
   storing said sequence of move commands and associated spatial coordinate data in a data store;
   mounting an evaluation window or door frame at a treatment position;
   moving the abrading tool in steps along the initial tool path from a starting position to one or more other positions along the initial tool path based on the sequence of move commands;
   depicting spatial coordinates of the abrading tool with the abrading tool positioned at the one or more other positions along the initial tool path relative to a fixed reference location;
   providing a user input and modifying the spatial coordinates in said data store for one or more of the sequence of move commands pointed to by the identifier to alter a position of the abrading tool at one or more of the other positions to define a modified tool path for use in abrading a window or a door frame;
   modifying the initial control program based on the modified tool path to provide a modified control program; and
   executing the modified control program with the robot controller to abrade one or more regions of window or door frame having a similar profile to the evaluation window or door frame.

2. The method of claim 1 additionally comprising providing an HMI having a control that initiates a reversal of movement of the tool to retrace all or part of the initial or modified tool path.

3. The method of claim 1 additionally comprising initiating a reversal of movement of the abrading tool in response to a sensed input relating to a condition of the abrading tool by creating a reversal path starting with a reversal of a move command executing when the condition of the abrading tool was sensed to a starting position of said abrading tool.

4. The method of claim 1 wherein the step of modifying the spatial coordinates comprises limiting the amount of modification to less than or equal to a threshold amount.

5. The method of claim 1 further comprising:
   selecting a specific abrading tool mounted to at least one robotic head; and
   creating an the array of move type commands and assigning line numbers as identifiers for the move type commands to identify the position of each move type commands within the array of move commands and writing a translated data file that includes move type coordinates for the selected at least one tool, wherein a given move command accesses its associated move type coordinates in the translated data file by the line number of said given move command.

6. The method of claim 1 additionally comprising initiating a reversal of movement of the abrading tool in response to an input by creating a reversal path starting with a reversal of a move command executing upon receipt of said input.

7. A non-transitory computer readable medium storing instructions executable by an associated processor to perform a method for implementing a tool path recovery program for a tool associated with an articulated robotic arm in a window cleaning system comprising:
   writing a path recovery file for a robotic head of an articulated multi-axis robotic arm comprising:
      parsing an initial control program for said robotic head and storing move commands from said control program in an array of move commands wherein each move command in said array of move commands is assigned a line number and creating a data target array from said initial control program including spatial coordinates that define travel limits of the move commands stored in the array of move commands;
      recording a line number corresponding to a current move command at a current position of a tool of the at least one robotic head to a storage medium;
      recording one or more line numbers for one or more move commands executed in said initial control program prior to said current move command from a previous tool position to the storage medium; and
      writing a path recovery program from the recorded line numbers and the move commands identified by said recorded line numbers; and
   executing the path recovery program comprising:
      accessing the path recovery program; and
      running the path recovery program associated with the robotic head.

8. A method for use in abrading regions of a window or door frame comprising:
   defining a sequence of movements for an abrading tool which bring said abrading tool into contact with one or more regions of a window or door frame and converting said sequence of movements into a control program for a robot controller coupled to a drive for moving said abrading tool along an initial tool path;

mounting a window or door frame at a treatment position;

moving the abrading tool in a sequence of steps along sub-paths from a starting position along the initial tool path toward an end position of the initial tool path;

suspending movement of the abrading tool prior to said tool reaching said end position;

generating a reverse path control program based on the initial tool path that retraces one or more sub-paths of the tool movement in reaching the location where movement was suspended; and transmitting the reverse path control program to the robot controller to cause said abrading tool to traverse all or part of the initial path in a reverse direction.

9. The method of claim 8 comprising maintaining a first array of move types commands and a second array of move type coordinates and wherein coordinate arguments for the move type commands are derived from a position of said move type commands in the first array by the programmable controller.

10. The method of claim 9 wherein in creating a reverse movement sub-path that retraces a previous sub-path, a move command for the reverse movement sub-path extracts data from two successive move commands that implement the initial tool path.

11. Apparatus for removing excess material from regions of a window or door frame comprising:

a robot having an articulating arm for mounting an abrading tool and moving said abrading tool along a tool path which brings said abrading tool into contact with one or more regions of a window or door frame;

a robot controller for causing the abrading tool to move in a sequence of movements defined by an initial control program for the robot controller through controlled activation of the robot to move said abrading tool along an initial tool path;

a memory store for storing a sequence of move commands and spatial coordinates for moving the abrading tool along the initial tool path and storing an ordered sequence of identifiers for locating move commands within said sequence of move commands that also identify spatial coordinates within the memory store associated with move commands in said sequence of move commands;

a human/machine interface including a display for depicting the spatial coordinates of the one or more move commands in the sequence of move commands that position the abrading tool at one or more positions along the initial tool path relative to a fixed reference location and for receiving a user input for modifying the spatial coordinates of the one or more move commands to define a modified tool path for use in abrading a window or a door frame; and a programmable controller for modifying the initial control program based on the modified tool path and transmitting a modified control program to the robot controller.

12. The apparatus of claim 11 where the initial and modified tool paths are divided into a series of sub-paths implemented by the sequence of move commands and wherein one or more of said sequence of move commands has spatial coordinates modified by said programmable controller to adjust the initial tool path in producing the modified tool path.

13. The apparatus of claim 12 wherein the programmable controller maintains a separate move command array and spatial coordinate argument array in the memory store and further wherein the programmable controller has a parser component that parses move commands and arguments for said move commands into the move command and spatial coordinate argument arrays and wherein the parser creates offsets into the spatial coordinate argument arrays based on line numbers associated with the move commands appended to said move commands and stored in the move command array.

14. The apparatus of claim 11 additionally comprising a fault input for indicating a fault, which causes the robot controller to stop movement of the abrading tool.

15. The apparatus of claim 14 wherein the programmable controller generates a fault return path which causes the robot controller to reverse its movement by retracing sub-paths in a then current control program whose execution has been stopped.

16. The apparatus of claim 11 additionally comprising a support for supporting a first window or door frame having a profile at a treatment position in relation to said robot and wherein said robot controller controls abrading of additional window or door frames having the same or similar profiles as the first window or door frame.

17. A method for removing material from regions of a window or door frame comprising:

defining a sequence of movements for an abrading tool mounted to an articulating multi-axis arm of a robot which brings said abrading tool into contact with one or more regions of a window or door frame and converting said sequence of movements into an initial control program for a robot controller to move said abrading tool along an initial tool path;

providing a read/write memory store and writing a sequence of move commands that implement the initial control program and also writing associated three dimensional spatial coordinates for said move commands to said read/write memory store, said move commands and associated spatial coordinate data pointed to by means of a identifier for each move command in the sequence of move commands;

moving the abrading tool in steps along the initial tool path from a starting position to one or more other positions along the initial tool path based on the sequence of move commands stored in the read/write memory store;

depicting three dimensional spatial coordinates stored in the read/write memory store of the tool with the tool positioned at the one or more other positions along the initial tool path relative to a fixed reference location;

providing a user input for modifying the three dimensional spatial coordinates in said memory store for one or more of the sequence of move commands to alter a position the abrading tool at the one or more of the other positions and thereby define a modified tool path for use in abrading a window or a door frame; and modifying the initial control program based on the modified tool path to provide a modified control program.

18. The method of claim 17 additionally comprising:

mounting an evaluation window or door frame at a treatment position;

depicting three dimensional spatial coordinates stored in the read/write memory store of the tool with the tool positioned at the one or more other positions along the initial tool path relative to the evaluation window or door frame;

providing a user input for modifying the three dimensional spatial coordinates in said memory store for one or more of the sequence of move commands to alter a position the abrading tool at the one or more of the other positions and to define the modified tool path;

modifying the initial control program based on the modified tool path to provide a modified control program; and executing the modified control program with the robot controller to abrade one or more regions of a window or door frame having a similar profile to the evaluation window or door frame.

19. Apparatus for removing material from regions of a window or door frame comprising:

a robot having a multi-axis articulating arm that supports an abrading tool, said robot comprising a robot controller for executing a robot control program for moving said abrading tool along an initial tool path;

a read/write memory store for storing an initial sequence of move commands that implement the robot control program and also storing associated three dimensional spatial coordinates for move commands within said initial sequence of move commands in said read/write memory store;

a control input for causing the robot controller to suspend controller execution of a current move command in said initial sequence of move commands; and a programmable controller for generating a reverse path robot control program by creating a reverse sequence of move commands and associated spatial coordinate data based on the initial sequence of move commands that retraces one or more sub-paths of abrading tool movement in reaching the location where controller execution was suspended;

wherein the programmable controller signals the robot controller to execute the reverse path control program to move the abrading tool to a previous position along the initial tool path.

20. The apparatus of claim 19 additionally comprising a human machine interface having a user actuated control for generating a stop signal at the control input.

21. The apparatus of claim 19 additionally comprising a sensor for sensing a condition of the robot or the abrading tool and generating a stop signal at the control input.

22. The apparatus of claim 19 additionally comprising a user actuated stop switch for generating a stop signal at the control input.

* * * * *